(12) United States Patent
Curson et al.

(10) Patent No.: US 11,548,206 B2
(45) Date of Patent: Jan. 10, 2023

(54) MULTI-AXIAL INTEGRAL GEOGRID AND METHODS OF MAKING AND USING SAME

(71) Applicant: Tensar International Corporation, Alpharetta, GA (US)

(72) Inventors: Andrew Curson, Burnley (GB); Tom-Ross Jenkins, Baildon (GB); Andrew Edward Waller, Newton le Willows (GB); Daniel John Gallagher, Adlington (GB); Daniel Mark Baker, Broomfield, CO (US); Manoj Kumar Tyagi, Fayetteville, GA (US); Joseph Cavanaugh, Cumming, GA (US)

(73) Assignee: TENSAR INTERNATIONAL CORPORATION, Alpharetta, GA (US)

( * ) Notice: Subject to any disclaimer, the term of this patent is extended or adjusted under 35 U.S.C. 154(b) by 0 days.

(21) Appl. No.: 17/841,037

(22) Filed: Jun. 15, 2022

(65) Prior Publication Data

US 2022/0379543 A1    Dec. 1, 2022

Related U.S. Application Data

(62) Division of application No. 17/355,843, filed on Jun. 23, 2021, now Pat. No. 11,390,015.

(Continued)

(51) Int. Cl.
*E02D 17/20* (2006.01)
*B29C 55/14* (2006.01)
(Continued)

(52) U.S. Cl.
CPC .............. *B29C 55/14* (2013.01); *B29C 55/12* (2013.01); *B29D 28/00* (2013.01); *E02D 17/202* (2013.01);
(Continued)

(58) Field of Classification Search
CPC ...................... E02D 2300/0084; E02D 17/202
See application file for complete search history.

(56) References Cited

U.S. PATENT DOCUMENTS

| 3,252,181 A | 5/1966 | Hureau |
| 3,317,951 A | 5/1967 | Hureau |

(Continued)

FOREIGN PATENT DOCUMENTS

| CN | 201411677 | 2/2010 |
| CN | 201826440 | 5/2011 |

(Continued)

OTHER PUBLICATIONS

Das, Braja, M. Use of geogrid in the construction of railroads. Innov. Infrastruc. Solut. (2016) 1:15, published Jun. 28, 2016.

(Continued)

*Primary Examiner* — Sean D Andrish
(74) *Attorney, Agent, or Firm* — Jacobson Holman PLLC

(57) ABSTRACT

A method of making a multi-axial integral geogrid suitable for stabilizing aggregate includes providing a polymer sheet, providing a patterned plurality of holes or depressions in the polymer sheet, and biaxially orienting the polymer sheet having the patterned plurality of holes or depressions therein to provide a plurality of interconnected oriented strands and partially oriented junctions forming a repeating pattern of outer hexagons having an array of openings. Oriented ribs extending inwardly from each of the outer hexagons support and surround a smaller inner hexagon having oriented strands, thus forming a plurality of trapezoidal openings and a single hexagonal opening. The oriented strands and partially oriented junctions of the outer hexagons form a plurality of linear strong axis strands extending continuously throughout the geogrid and forming triangular openings. The method provides a geogrid having a geometry config- (Continued)

ured to engage with, confine, and stabilize a large variety and quality of aggregates.

19 Claims, 34 Drawing Sheets

Related U.S. Application Data

(60) Provisional application No. 63/043,627, filed on Jun. 24, 2020, provisional application No. 63/154,209, filed on Feb. 26, 2021, provisional application No. 63/154,588, filed on Feb. 26, 2021.

(51) Int. Cl.
*B29D 28/00* (2006.01)
*B29C 55/12* (2006.01)
*B29L 28/00* (2006.01)

(52) U.S. Cl.
CPC ... *B29L 2028/00* (2013.01); *E02D 2300/0084* (2013.01)

(56) References Cited

U.S. PATENT DOCUMENTS

| | | | |
|---|---|---|---|
| 3,496,965 A | 2/1970 | Hureau | |
| 4,374,798 A | 2/1983 | Mercer | |
| 4,470,942 A | 9/1984 | Beretta | |
| 4,590,029 A | 5/1986 | Mercer | |
| 4,743,486 A | 5/1988 | Mercer et al. | |
| 4,756,946 A | 7/1988 | Mercer | |
| 4,808,358 A | 2/1989 | Beretta | |
| 5,053,264 A | 10/1991 | Beretta | |
| 5,419,659 A | 5/1995 | Mercer | |
| 7,001,112 B2 | 2/2006 | Walsh | |
| 9,315,953 B2 | 4/2016 | White | |
| 9,556,580 B2 | 1/2017 | Walsh | |
| 10,024,002 B2 | 7/2018 | Walsh | |
| 10,501,896 B2 | 12/2019 | Walsh | |
| 2009/0214821 A1 | 8/2009 | Walsh | |

FOREIGN PATENT DOCUMENTS

| | | |
|---|---|---|
| CN | 102615817 | 8/2012 |
| CN | 102615818 | 8/2012 |
| CN | 203855867 | 10/2014 |
| CN | 205171489 | 4/2016 |
| CN | 205421227 | 8/2016 |
| CN | 205990615 | 3/2017 |
| CN | 208039219 | 11/2018 |

OTHER PUBLICATIONS

Webster, S.L. Geogrid reinforced based courses for flexible pavements for light aircraft: Test section construction, behavior under traffic, laboratory tests, and design criteria. Report DOT/FAA/RD-92, Dec. 1992.

Ghafoori, Nader, Ph.D et al. Use of geogrid for strengthening and reducing the roadway structural sections. NDOT Research Report No. 327-12-803, Jan. 2016.

Giroud, J.P. et al. Discussion of "Design Method for Geogrid-Reinforced Unpaved Roads, I: Development of Design Method." Journal of Geotechnical and Geoenvironmental Engineering. Aug. 2004, vol. 130, No. 8, pp. 775-786.

Koerner, Robert M. Designing with Geosynthetics, Fourth Edition, 1998.

"Geosynthetic Design & Construction Guidelines—Reference Manual—NHI Course N. 132013," U.S. Department of Transportation Federal Highway Administration Publication No. FHWA NHI-07-092, Aug. 28, 2008.

MULTI-AXIAL INTEGRAL GEOGRID AND METHODS OF MAKING AND USING SAME

CROSS-REFERENCE TO RELATED APPLICATIONS

This application claims the benefit of priority to U.S. Provisional Application for Patent No. 63/043,627 filed Jun. 24, 2020, U.S. Provisional Application for Patent No. 63/154,209 filed Feb. 26, 2021, and U.S. Provisional Application for Patent No. 63/154,588 filed Feb. 26, 2021.

BACKGROUND OF THE INVENTION

1. Field of the Invention

The present invention relates generally to integral geogrids and other oriented grids used for structural or construction reinforcement and stabilization, and other geotechnical purposes. More particularly, the present invention relates to such integral geogrids having a monolayer multi-axial grid geometry with an enhanced ability to engage with, confine and stabilize a greater variety and range of quality of aggregates, as well as other desirable characteristics as disclosed herein, that, when combined deliver improved performance, greater economic benefits, and improved environmental benefits.

This invention also relates to the method of producing such multi-axial integral geogrids.

Lastly, the present invention relates to the use of such multi-axial integral geogrids for soil and particulate reinforcement and stabilization, and methods of such reinforcement and stabilization.

For the purpose of this invention, the term "integral geogrid" is intended to include integral geogrids and other integral grid structures made by orienting, i.e. stretching, a polymeric starting material in the form of a sheet or a sheet-like shape of a requisite thickness and having holes or depressions provided therein.

2. Description of Related Art

Polymeric integral grid structures having mesh openings defined by various geometric patterns of substantially parallel, oriented strands and junctions therebetween, such as integral geogrids, have been manufactured for over 35 years. Such grids are manufactured by extruding and forming an integrally cast starting sheet having a defined pattern of holes or depressions which is followed by the controlled uniaxial or biaxial stretching and orientation of the sheet into highly oriented strands and partially oriented junctions defined by mesh openings formed by the holes or depressions. Such stretching and orienting of the sheet in either a uniaxial or biaxial direction develops strand tensile strength and modulus in the corresponding strand directions. It is also known that not only is strand strength important, but junction strength is also important in the performance of these grid structures. These integral oriented polymer grid structures can be used for retaining or stabilizing particulate material of any suitable form, such as soil, earth, sand, clay, gravel, etc. and in any suitable location, such as on the side of a road or other cutting or embankment, beneath a road surface, runway surface, etc.

Various shapes and patterns of holes have been experimented with to achieve higher levels of strength to weight ratio, or to achieve faster processing speeds during the manufacturing process. Orientation is accomplished under controlled temperatures and strain rates. Some of the variables in this process include draw ratio, molecular weight, molecular weight distribution, and degree of branching or cross linking of the polymer.

The manufacture and use of such integral geogrids and other integral grid structures can be accomplished by well-known techniques. As described in detail in U.S. Pat. No. 4,374,798 to Mercer, U.S. Pat. No. 4,590,029 to Mercer, U.S. Pat. No. 4,743,486 to Mercer and Martin, U.S. Pat. No. 4,756,946 to Mercer, and U.S. Pat. No. 5,419,659 to Mercer, a starting polymeric sheet material is first extruded and then punched to form the requisite defined pattern of holes or depressions. The integral geogrid is then formed by the requisite stretching and orienting the punched sheet material.

Such integral geogrids, both uniaxial integral geogrids and biaxial integral geogrids (collectively "integral geogrids," or separately "uniaxial integral geogrid(s)" or "biaxial integral geogrid(s)") were invented by the aforementioned Mercer in the late 1970s and have been a tremendous commercial success over the past 35 years, totally revolutionizing the technology of reinforcing soils, roadway foundation layer and other civil engineering structures made from granular aggregates or particulate materials.

Mercer discovered that by starting with a relatively thick, substantially uniplanar polymer starting sheet, preferably on the order of 1.5 mm (approximately 0.06 inch) to 4.0 mm (approximately 0.16 inch) thick, having a pattern of holes or depressions whose centers lie on a notional substantially square or rectangular grid of rows and columns, and stretching the starting sheet either unilaterally or biaxially so that the orientation of the strands extends into the junctions, a totally new substantially uniplanar integral geogrid could be formed. As described by Mercer, "uniplanar" means that all zones of the sheet-like material are generally symmetrical about the median plane of the sheet-like material. The Mercer geogrids addressed needs relating to their use in civil and geotechnical engineering applications wherein strands in one or two directions and with high strength and stiffness, and junctions with high integrity and stiffness, were required to allow the geogrid to be robust and fit for purpose in civil and geotechnical engineering applications, and to enable the soil and aggregate particles to fall into and be constrained by the strands and junctions.

In U.S. Pat. Nos. 3,252,181, 3,317,951, 3,496,965, 4,470,942, 4,808,358 and 5,053,264, the starting material with the requisite pattern of holes or depressions is formed in conjunction with a cylindrical polymer extrusion and substantial uniplanarity is achieved by passing the extrusion over an expanding mandrel. The expanded cylinder is then slit longitudinally to produce a flat substantially uniplanar starting sheet.

Another integral geogrid is described in U.S. Pat. No. 7,001,112 to Walsh (hereinafter the "Walsh '112 patent"), assigned to Tensar International Limited, an associated company of the assignee of the instant application for patent, Tensar International Corporation, Inc. (hereinafter "Tensar") of Atlanta, Ga. The Walsh '112 patent discloses oriented polymer integral geogrids including a biaxially stretched integral geogrid in which oriented strands form triangular mesh openings with a partially oriented junction at each corner, and with six highly oriented strands meeting at each junction (hereinafter sometimes referred to herein as "triaxial integral geogrid"). The triaxial integral geogrids of the Walsh '112 patent have been commercialized by Tensar to substantial success. The Walsh '112 patent geogrids addressed needs to improve upon the Mercer art by adding strands in more than two directions and with high strength and stiffness, and junctions with high integrity and stiffness, so as to better distribute and resist loadings experienced during use, and the use of triangular apertures to improve upon the ability of the geogrid to constrain and support the soil or aggregate installed with the geogrid.

More recently, improved integral geogrids are disclosed in U.S. Pat. No. 9,556,580 to Walsh, U.S. Pat. No. 10,024,002 to Walsh, and U.S. Pat. No. 10,501,896 to Walsh, all of which are assigned to Tensar Technologies Limited, another associated company of the assignee of the instant application for patent. The aforementioned Walsh U.S. Pat. Nos. 9,556,580, 10,024,002, and 10,501,896 disclose an integral geogrid having what is known to one skilled in the art as a high aspect ratio, i.e., a ratio of the thickness or height of the strand cross section to the width of the strand cross section that is greater than 1.0. Henceforth, these patents are referred to as the High Aspect Ratio patents or the Walsh HAR patent or patents. The high aspect ratio geogrids of the Walsh HAR patents have also been commercialized by Tensar to substantial success.

The teaching of the Walsh HAR patents is that a multi-axial geogrid of adequate aperture stability modulus (ASM) with rib or strand cross-sections having a high aspect ratio provides improved performance when the geogrid is utilized as a reinforcing or stabilizing component in a civil engineering structure, for example, a roadway or railway where one or more layers of geogrid are employed as both subgrade improvement or base course reinforcement. This teaching of the Walsh HAR patents superseded prior art teaching that having a maximum aperture stability modulus was desirable.

The Walsh HAR patents show that in conventional multi-axial geogrids the relationship between rib aspect ratio and trafficking performance, exemplified by the relationship between rib aspect ratio and rut depth shown in Walsh's FIG. 5, is not linear. While a change in aspect ratio from 0.375 to 1.4 reduces rut depth from 38 mm to 23 mm, an increase in aspect ratio from 1.4 to 2.2 provides a decrease in rut depth to 19 mm. While this improvement is meaningful, simply increasing the rib aspect ratio further by increasing the thickness of the grid structure adds weight and increases product cost.

The Walsh HAR patents demonstrate a further improvement on the Walsh art of adding strands in more than two directions and with high strength and stiffness, and junctions with high integrity and stiffness, and further improving the geogrid's ability to constrain and support the soil or aggregate installed with the geogrid by carefully modifying the dimensions and positioning of the tensile strands.

Still another integral geogrid is disclosed in CN 102615818 A, which is directed to a plastic geogrid having a geometry resembling a tortoiseshell pattern. While a "hexagon-within-hexagon" grid geometry is disclosed, there are no strands in the geometry that are linearly continuous across either the length or the width of the geogrid.

Thus, an integral geogrid produced from the above-described conventional starting materials may exhibit generally satisfactory properties for the purposes of engaging with and stabilizing soil and other aggregates. However, the absence of linear strands which extend continuously throughout the entirety of the geogrid greatly impairs the structural integrity of the geometry and limits the in-plane tensile properties of the geogrid and its usefulness in geo-synthetic applications.

It is intended that the present invention be applicable to all integral grids regardless of the method of starting sheet formation or of the method of orienting the starting material into the integral geogrid or grid structure. The subject matter of the foregoing U.S. Pat. Nos. 3,252,181, 3,317,951, 3,496,965, 4,470,942, 4,808,358, 5,053,264, 7,001,112, 9,556,580, 10,024,002, and 10,501,896 is expressly incorporated into this specification by reference as if the disclosures were set forth herein in their entireties. These patents are cited as illustrative, and are not considered to be inclusive, or to exclude other techniques known in the art for the production of integral polymer grid materials.

The mechanisms for explaining and/or predicting the performance of a geosynthetic that includes multi-axial geogrids on a granular material such as soil or stone when used in roadway applications to resist the rutting effects of vehicle traffic, are still being developed. Studies have shown that it is not possible to describe and/or predict the performance of a geogrid in roadway applications based on physical and/or mechanical properties of the geogrid alone. See, for example, Giroud, J. P. and Han, J., "Closure to 'Design Method for Geogrid-Reinforced Unpaved Roads, I: Development of Design Method,'" *Journal of Geotechnical and Geoenvironmental Engineering*, ASCE, Vol. 130, No. 8, pp. 775-786, August 2004; Webster, S. L., "Geogrid Reinforced Base Course for Flexible Pavements for Light Aircraft: Test Section Construction, Behavior under Traffic, Laboratory Tests, and Design Criteria," *Report DOT/FAA/RD-92*, December 1992. It is therefore necessary to consider the composite matrix consisting of the geogrid and the granular material that is confined and restrained by the geogrid.

Existing prior art geogrids have been developed with a view to optimizing the relationship between size of the granular material and the size of the geogrid apertures with the goal of achieving a high degree of "strike through" or "penetration", i.e., a high proportion of the aggregate gradation falls into the apertures of the geogrid so that the granular materials can bear against the sidewalls of the confining ribs. See for example, Mercer U.S. Pat. No. 5,419,659, col. 21, lines 32-43; Walsh HAR U.S. Pat. No. 10,501,896, col. 1, lines 51-64 and col. 4, line 62—col. 5, line 11; "Geosynthetic Design & Construction Guidelines—Reference Manual— NIH Course No. 132013," U.S. Department of Transportation Federal Highway Administration Publication No. FHWA NHI-07-092, Aug. 28, 2008; "Use of Geogrid for Strengthening and Reducing the Roadway Structural Sections," *NDOT Research Report*, Report No. 327-12-803, January 2016. In the case of the Walsh HAR patents and other prior art, the single size of the apertures was matched to a relatively large granular particle size with the intention being that these individual particles were fully confined. See the approach of the triaxial integral geogrid 200 of the Walsh HAR patents as illustrated in FIG. 30.

Thus, for optimal performance, the range of optimal aggregate particle size was limited by the aperture size of the selected geogrid structure for each geogrid application.

Civil infrastructure, such as roads, continues to age and underperform and there is a growing need to replace and upgrade these assets. Concurrently, the materials traditionally used in construction of roads and other civil infrastructure continue to increase in cost and scarcity, particularly due to the environmental impacts of quarrying for high quality natural aggregates. As a result, there is a growing need for use of materials that are more readily available and that have lower environmental impacts in sourcing. Typically, these materials differ in their properties from traditional materials, and often have lower performance capabilities.

Therefore, a commercial and environmental need exists for a geogrid material that can facilitate improved performance and economies while at the same time lessen the environmental impact of civil infrastructure such as roads. A need therefore exists for an integral geogrid having a geometry that can engage with, confine and stabilize a greater variety and range of quality of aggregates than geometries associated with conventional geogrids, and having a geometry that includes continuous strands in at least two directions, while simultaneously providing a variety of degrees of localized out-of-plane stiffness, in addition to other desirable properties not available with current integral geogrids.

SUMMARY OF THE INVENTION

To attain the aforementioned geometry that can engage with, confine and stabilize a greater variety and range of quality of aggregates than geometries associated with prior geogrid structures, and having a geometry that includes continuous strands in at least two directions, while simultaneously providing a variety of degrees of localized out-of-plane and in-plane stiffness, and other desirable characteristics, the present invention provides a monolayer multi-axial grid having a repeating geometry comprising different shapes and sizes of apertures, formed from ribs of different lengths, heights and widths, in which the ribs preferably have an aspect ratio greater than 1.0, and in which some of the ribs extend transversely and diagonally in a continuous linear fashion across the grid, while other strands are interrupted to provide zones of local compliance.

More specifically, the multi-axial geogrid according to the present invention combines the following features:
  ribs of differing width and depth while preferably retaining high aspect ratios
  different aperture shapes and sizes to better accommodate varying granular materials
  a repeating geometry that increases the number of oriented ribs per unit area to better confine granular material
  a repeating geometry that increases the number of angles formed between oriented ribs per unit area to better confine granular material
  a repeating geometry that contains different angles of confinement formed between oriented ribs per unit area to better confine granular material
  integral junctions to facilitate load distribution
  stabilizing and strengthening strong axis strands which extend continuously in a plurality of directions throughout the entirety of the geogrid to optimize load distribution
  locally variable in-plane and out-of-plane stiffness.

In one preferred embodiment, the present invention employs a repeating pattern of interconnected oriented strands and partially oriented junctions forming a repeating pattern of outer hexagons, each of which supports and surrounds an inner smaller hexagon to define three different shaped openings of a monolayer multi-axial integral geogrid. In addition, to provide additional strength and stability, the geometry of the outer hexagons form or define a plurality of linear strands, or strong axis strands or ribs, that extend continuously throughout the entirety of the multi-axial integral geogrid without crossing into the interior of other outer hexagons, thus making the geogrid suitable for stabilizing aggregate. It will be understood that the continuous linear strands consist of the oriented strands and partially oriented junctions that define the outer hexagons and align in the same line or strand direction. The continuous linear strands of the outer hexagons also form triangular openings between adjacent outer hexagons which are repeating throughout the entirety of the geogrid and are unobstructed by additional strands or ribs therein.

As so formed, the inner hexagon is comprised of six oriented strands which define a hexagonal opening unobstructed by additional strands or ribs. The inner hexagon is supported by six oriented connecting strands which extend from the partially oriented junctions of the outer hexagon to a respective corner of the inner hexagon to form oriented tri-nodes. The tri-nodes have a much higher level of orientation than the partially oriented junctions, and tend towards being fully oriented. The six oriented strands which comprise the inner hexagon and the six supporting oriented connecting strands, together with the adjacent oriented strands of the outer hexagon, form six trapezoid apertures all of which are unobstructed by additional strands or ribs.

The configuration as described in the previous paragraph also creates a structure in which the inner hexagon is suspended, i.e., floating, relative to the outer hexagon structure. This structure allows the inner hexagon to shift up or down so as to "float" or flex, i.e. deform, relative to the primary plane of the geogrid and relative to the continuous linear strands that consist of the oriented strands and partially oriented junctions that define the outer hexagons Thus, during placement and compaction of the aggregate, the floating inner hexagon enhances the geogrid's ability to engage with, confine and stabilize the aggregate.

The foregoing geogrid structure is often hereinafter referred to as a "repeating floating hexagon within a hexagon pattern" or more simply a "floating hexagon within a hexagon pattern."

According to one embodiment of the present invention, a starting material for making a multi-axial integral geogrid includes a polymer sheet having holes or depressions therein that provide a variety of shaped openings when the starting material is biaxially stretched.

According to another embodiment of the present invention, a multi-axial integral geogrid includes a repeating floating hexagon within a hexagon pattern.

According to still another embodiment of the present invention, a soil construction includes a mass of particulate material strengthened and stabilized by embedding therein a multi-axial integral geogrid having a repeating floating hexagon within a hexagon pattern produced from a polymer starting sheet.

According to yet another embodiment of the present invention, a method of making a starting material for a multi-axial integral geogrid includes providing a polymer sheet, and providing holes or depressions therein to form a multi-axial integral geogrid having a repeating floating hexagon within a hexagon pattern of interconnected, oriented strands, and openings.

According to another embodiment of the present invention, a method of making a multi-axial integral geogrid includes providing a polymer sheet, providing holes or depressions therein, and biaxially stretching the polymer sheet having the holes or depressions therein so as to provide a plurality of interconnected, oriented strands having a variety of shaped openings therein in the form of a repeating floating hexagon within a hexagon pattern.

And, according to yet another embodiment of the present invention, a method of strengthening a mass of particulate material includes embedding in the mass of particulate material a multi-axial integral geogrid having a repeating floating hexagon within a hexagon pattern produced from a polymer sheet that is suitable for use in stabilizing the mass of particulate material.

Accordingly, it is an object of the present invention to provide a starting material for making a multi-axial integral geogrid having a repeating floating hexagon within a hexagon pattern. The starting material includes a polymer sheet having holes or depressions therein that provide openings when the starting material is biaxially stretched.

Another object of the present invention is to provide a multi-axial integral geogrid suitable for stabilizing and strengthening aggregate that includes a repeating floating hexagon within a hexagon pattern that is produced from a polymer sheet, with linear strands that extend continuously throughout the entirety of the multi-axial integral geogrid. An associated object of the invention is to provide a geometry that can engage with, confine and stabilize a greater variety and range of quality of aggregates than geometries associated with prior geogrid structures, while at the same time providing a variety of degrees of localized out-of-plane and in-plane stiffness, and other desirable characteristics.

Still another object of the present invention is to provide a soil construction that includes a mass of particulate material strengthened and stabilized by embedding therein a multi-axial integral geogrid having a repeating floating hexagon within a hexagon pattern produced from a polymer sheet.

Yet another object of the present invention is to provide a method of making a starting material for a multi-axial integral geogrid that includes providing a polymer sheet, and providing holes or depressions therein to form a multi-axial integral geogrid having a repeating floating hexagon within a hexagon pattern of interconnected, oriented strands, and openings.

Another object of the present invention is to provide a method of making an integral geogrid. The method includes providing a polymer sheet, providing holes or depressions therein, and biaxially stretching the polymer sheet having the holes or depressions therein so as to provide a plurality of interconnected, oriented strands having an array of openings therein, a repeating floating hexagon within a hexagon pattern of the interconnected, oriented strands and openings, including linear strands that extend continuously throughout an entirety of the multi-axial integral geogrid. The method can employ known geogrid fabrication methods, such as those described in the aforementioned U.S. Pat. Nos. 4,374,798, 4,590,029, 4,743,486, 5,419,659, 7,001,112, 9,556,580, 10,024,002, and 10,501,896 as well as in other patents.

The numerous advantages associated with the multi-axial integral geogrid according to the present invention are varied in nature. By virtue of the repeating floating hexagon within a hexagon pattern of the interconnected, oriented strands and openings, the multi-axial integral geogrid can better accommodate varying aggregate sizes, i.e., by varying the limiting aperture dimensions. While prior commercial integral geogrid structures typically have one basic shape and one limiting dimension, the multi-axial integral geogrid of the present invention leverages three different basic shapes—in this example, a hexagon, a trapezoid, and a triangle. In turn, these shapes are defined and bound by oriented strands or ribs of varying shape and dimension. As such, the multi-axial integral geogrid of the present invention can better accommodate the normally occurring varying angles, orientation, and sizes of aggregate as it is distributed across the geogrid.

Further, the multi-axial integral geogrid of the present invention is more suitable for stabilizing a greater variety of aggregate by providing an enhanced range of distribution of aperture size, resulting in the ability to engage with, confine and stabilize a greater variety and range of quality of aggregates compared to that of triangles or rectangles of generally a single size as presented in prior multi-axial integral geogrids. The pattern of the multi-axial integral geogrid of the present invention has an unimpeded open inner hexagon, combined with the larger surrounding hexagon, which provides optimal aggregate confinement and lateral restraint. Further distribution of aperture size is achieved via repeating trapezoid and triangle shaped apertures.

In addition, the multi-axial integral geogrid of the present invention provides higher aspect ratios on all strands compared to those of prior integral geogrids. Because the high aspect ratio of the present invention increases aggregate interlock, the multi-axial integral geogrid of the present invention can better accommodate the varying aspect ratios of aggregate.

By virtue of the repeating floating hexagon within a hexagon pattern of the interconnected, oriented strands and openings, the multi-axial integral geogrid of the present invention is also characterized by an increased number and type of strand elements relative to prior integral geogrids. And, the multi-axial integral geogrid of the present invention has an increased number of oriented tensile elements and a reduced number of partially oriented junctions. As such, the multi-axial integral geogrid of the present invention is characterized by a variety of degrees of out-of-plane and in-plane localized stiffness.

While the multi-axial geometry of the present invention imparts overall greater in-plane rotational stiffness to the integral geogrid, the shorter length strands increase the rotational stiffness of the integral geogrid relative to that of prior integral geogrids. Thus, the multi-axial integral geogrid is characterized by a compliant, i.e., initial give or flexibility, that leads to better compaction and higher density, yet with a final horizontal aggregate geogrid composite stiffness that is greater as a result of the initial give.

And, the multi-axial integral geogrid of the present invention has an increased number of confinement elements, i.e., strands, that provide concentric-like resistance to aggregate movement. In a like-for-like hexagon size, relative to a conventional triaxial integral geogrid, the multi-axial integral geogrid of the present invention provides twice as many confinement elements to bear against radial loading motion during compaction and trafficking.

In summary, by virtue of the repeating floating hexagon within a hexagon pattern of the interconnected, oriented strands and openings, the preferred multi-axial integral geogrid of the present invention has an increased number and type of strand elements and angles of confinement or "nooks," and has an inner hexagon suspended for restricted out of plane movement up and down. These characteristics result in more opportunities for accommodating and confining aggregate while maintaining the overall structural integrity of the integral geogrid. Further, by including linear strands of connected oriented strands (or ribs) and partially oriented junctions that extend continuously throughout the entirety of the multi-axial integral geogrid, the multi-axial geogrid of the present invention has increased strength and stability as an aggregate reinforcement.

These together with other objects and advantages which will become subsequently apparent reside in the details of construction and operation as more fully hereinafter described, reference being had to the accompanying drawings forming a part hereof, wherein like reference numbers refer to like parts throughout. The accompanying drawings are intended to illustrate the invention, but are not necessarily to scale.

DETAILED DESCRIPTION OF THE PREFERRED EMBODIMENTS

Figure 1:
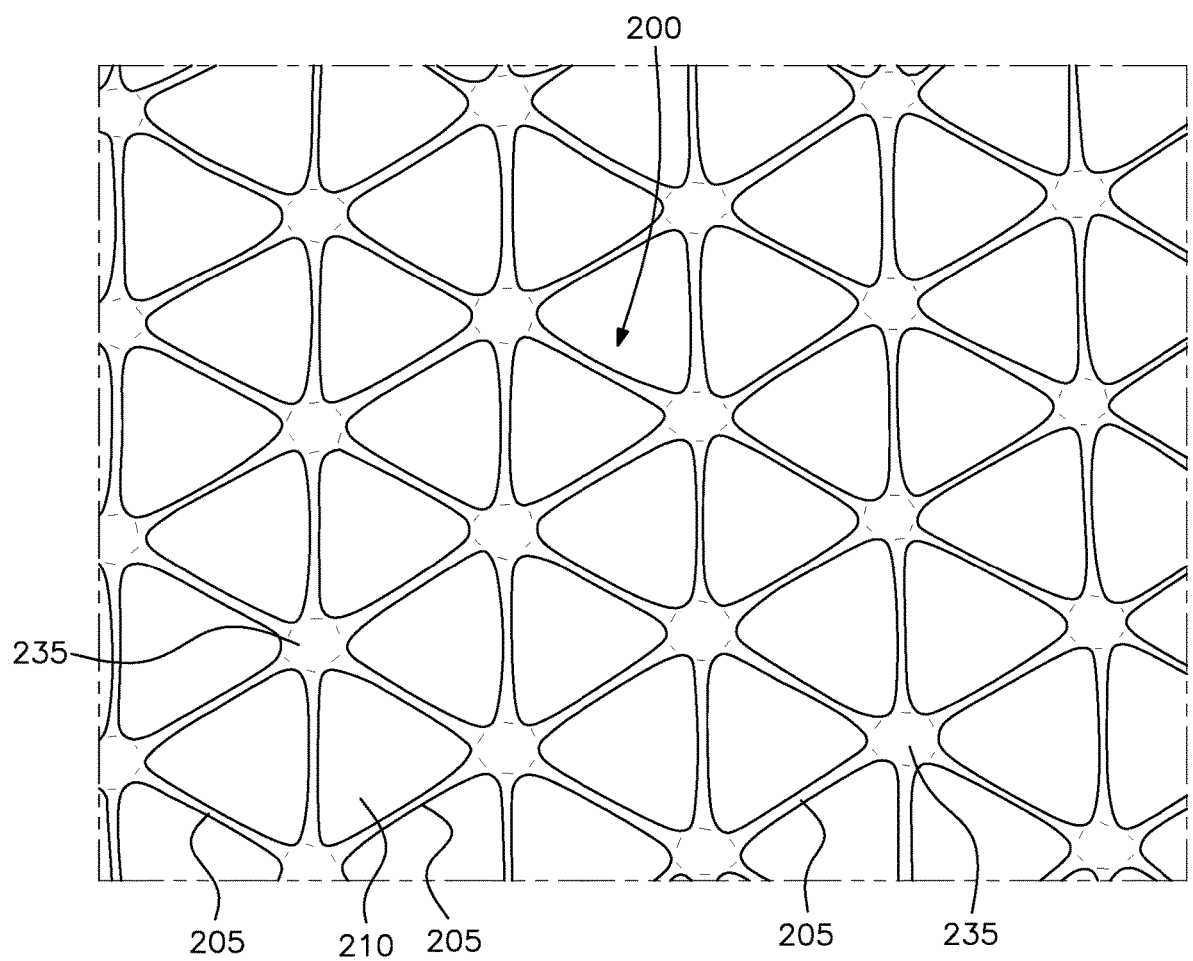
FIG. 1 is a plan view of an integral geogrid according to the prior art Walsh '112 patent.

Although only preferred embodiments of the invention are explained in detail, it is to be understood that the invention is not limited in its scope to the details of construction and arrangement of components set forth in the following description or illustrated in the drawings. As described hereinafter, the present invention is capable of other embodiments and of being practiced or carried out in various ways.

Also, for the purposes of this specification, including the appended claims, certain terminology will be resorted to for the sake of clarity in describing the preferred embodiments. It is intended that each term contemplates its broadest meaning as understood by those skilled in the art, and includes all technical equivalents which operate in a similar manner to accomplish a similar purpose. As used herein, the terms "oriented", "orientation", and "highly oriented" as applied to the strands of the outer hexagon and the strands or ribs and tri-nodes of the inner hexagon, as well as the term "partially oriented" or "partial orientation" as applied to the junctions of the outer hexagon shall have the meanings well known to those skilled in the art in connection with the geogrids over the past many years. For example, the term "partially oriented" as applied to the junctions of the outer hexagon is readily apparent when compared to the strands of the outer hexagon and the strands or ribs and tri-nodes of the inner hexagon in that the junctions are considerably larger and thicker, as illustrated in the drawings herein.

As such, the level of orientation in the geogrid is that which can be observed by examining the geogrid to determine the extent to which the thickness of the geogrid has been narrowed or thinned from the corresponding thickness of the starting sheet caused by the stretching or orientating process, as well as by the striations which can be observed in the geogrid by visual (naked eye) examination or scanning electron microscope. Such terms are not intended to require determination of striation on a molecular level, such as for example, by microscopic examination of orientation of the polymer molecules.

And, for the purposes of this specification, including the appended claims, the term "about" when modifying numbers expressing a number of sizes, dimensions, portions, shapes, formulations, parameters, percentages, quantities, characteristics and other numerical values used in the specification and claims, the term is meant to encompass the stated value plus or minus 10%.

In addition, for the purposes of this specification, including the appended claims, the terms "aperture" and "opening" are used interchangeably herein, and the terms are meant to describe any of the plurality of open spaces located within the strands or ribs of the multi-axial integral geogrid.

The present invention is directed to a multi-axial integral geogrid structure produced from a polymer sheet as the starting material. According to a preferred embodiment of the invention, the polymer sheet starting material is substantially flat, and preferably uniplanar or substantially uniplanar.

The invention is based on the fact that the polymer sheet, when converted to a multi-axial integral geogrid via a starting sheet having a selected pattern of holes or depressions and oven stretching process, produces a finished product that has unique characteristics relative to prior uniaxial, biaxial, and triaxial geogrids for purposes of soil and other aggregate reinforcement and stabilization, and other geotechnical applications.

FIG. 1 is a plan view of an integral geogrid according to the prior art, i.e., a triaxial integral geogrid according to the Walsh '112 patent. As shown in FIG. 1, the triaxial integral geogrid 200 has a repeating triangle 210 geometry. The triaxial integral geogrid 200 includes a plurality of oriented strands 205 interconnected by partially oriented junctions 235 wherein the six triangular openings 210 surrounding each junction 235 create a repeating hexagon geometry.

Figure 2:
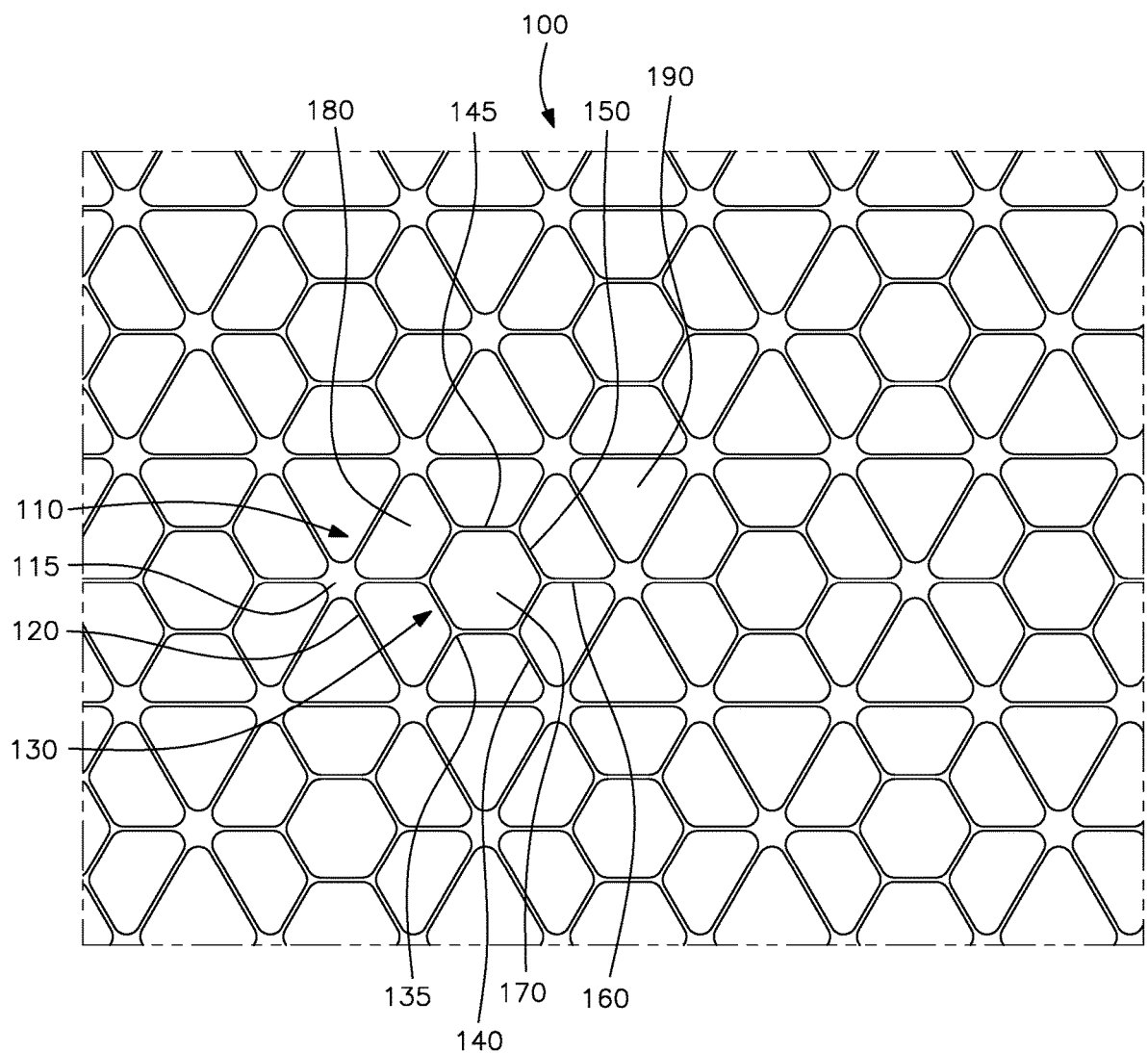
FIG. 2 is a plan view of a multi-axial integral geogrid according to a preferred embodiment of the present invention.

FIG. 2 is a plan view of a monolayer multi-axial integral geogrid 100 according to a preferred embodiment of the present invention. The multi-axial integral geogrid 100 includes a plurality of interconnected, oriented strands having an array of openings therein, a repeating floating hexagon within a hexagon pattern of the interconnected, oriented strands and the openings, and including linear strands that extend continuously throughout an entirety of the multi-axial integral geogrid. More specifically, multi-axial integral geogrid 100 includes a repeating pattern of floating inner hexagons 130 within each outer hexagon 110. The outer hexagon 110 includes a plurality of outer oriented strands or ribs 120 interconnected by partially oriented junctions 115. The inner hexagon 130 includes a plurality of oriented connecting strands 145 and 150 interconnected by tri-nodes 135, and encompasses a hexagon-shaped center opening 170. The outer hexagon 110 is connected to the smaller inner hexagon 130 by a plurality of supporting strands or ribs 140 and 160, which define a plurality of trapezoid-shaped openings 180. At the center of each pattern of three adjacent outer hexagons 110 is a triangular shaped opening 190. As shown, junctions 115 are much larger than tri-nodes 135.

As is evident from FIG. 2, another feature of the multi-axial integral geogrid of the present invention is the linearly continuous nature of the outer strands 120 of the repeating outer hexagon pattern. That is, the oriented strands 120 are linearly continuous, via partially oriented junctions 115, as they extend continuously throughout the entirety of the multi-axial integral geogrid in three different directions separated from each other by approximately 120°, and indicated by arrows 120A, 120B, and 120C in FIGS. 4 and 5. Those skilled in the art will appreciate that different orientations of the same basic geometry are possible after stretching, if an appropriate corresponding rotation of the punched starting sheet geometry is made. The linearly continuous nature of the strands 120 provides the necessary enhanced strength and in-plane stiffness to the multi-axial integral geogrid of the present invention.

Figure 3:
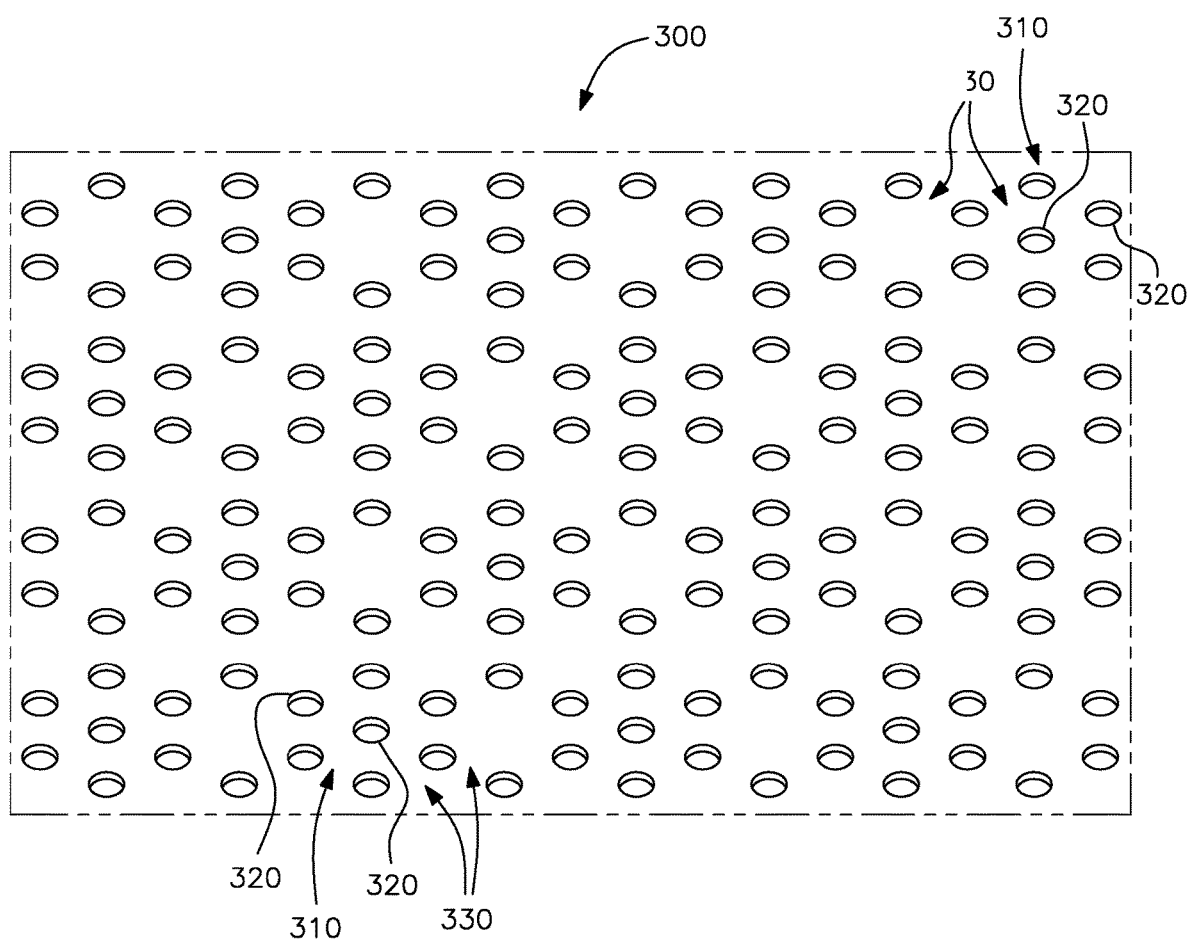
FIG. 3 is a top perspective view of a starting sheet material having holes or depressions formed therein for forming the multi-axial integral geogrid shown in FIG. 2.

FIG. 3 is a perspective view of a starting monolayer material sheet 300 having holes or depressions formed therein for forming the multi-axial integral geogrid shown in FIG. 2. The monolayer starting sheet 300 used as the starting material for a multi-axial integral geogrid according to the present invention is preferably through-punched, although it may be possible to use depressions formed therein instead. According to the embodiment of the starting material in which depressions are formed in the sheet, the depressions are provided on each side of the sheet, i.e., on both the top and the bottom of the sheet.

Figure 3A:
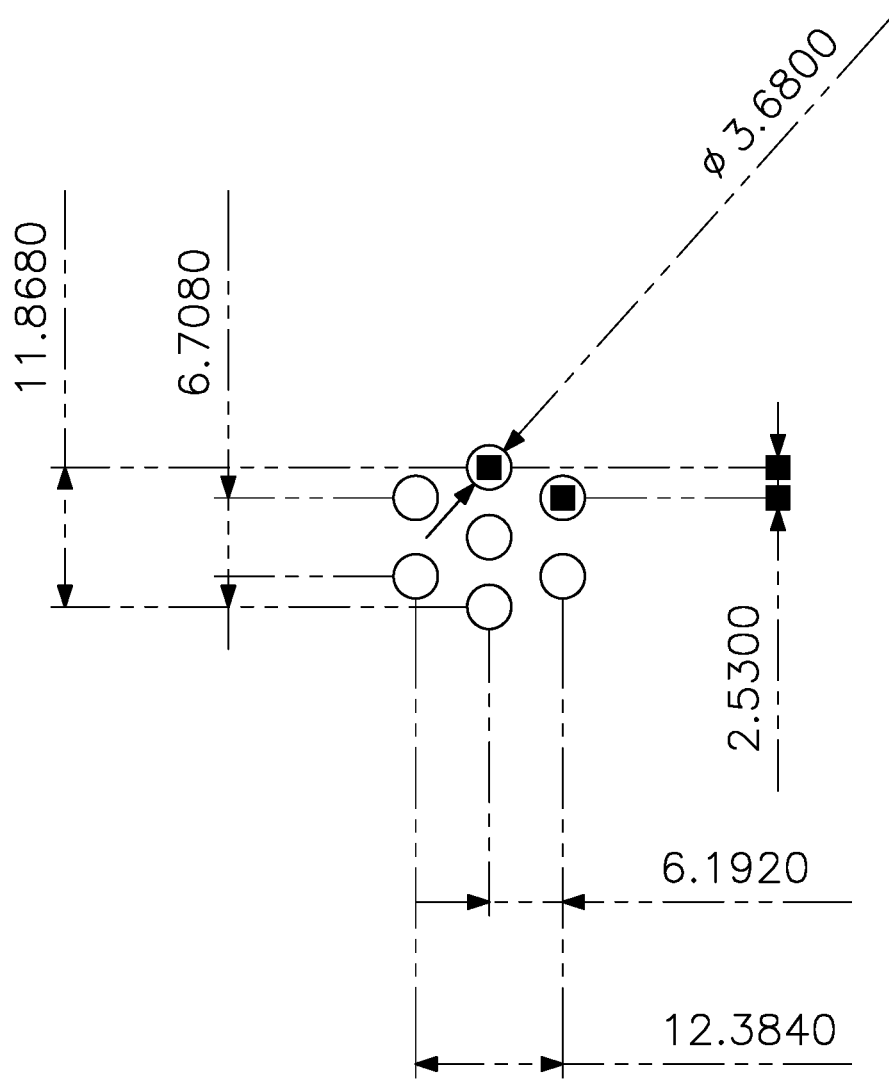
FIG. 3A is a plan view of a possible size and spacing for the holes shown in the starting sheet material of FIG. 3.

The monolayer starting sheet 300 includes a repeating pattern 310 of holes 320 and spacing 330 that when oriented provide the floating hexagon within a hexagon pattern of the multi-axial integral geogrid shown in FIG. 2. According to one possible embodiment of the present invention, the diameter of holes 320 is 3.68 mm, and the spacing of the holes 330 in millimeters is as shown in FIG. 3A.

Preferably, the overall thickness of the monolayer material sheet 300 is from about 3 mm to about 10 mm and, more preferably, the overall thickness of the monolayer material sheet 300 is from about 5 mm to about 8 mm.

And, in general, the monolayer material sheet 300 is polymeric in nature. For example, the material of construction may include high molecular weight polyolefins, and broad specification polymers. Further, the polymeric materials may be virgin stock, or may be recycled materials, such as, for example, post-industrial or post-consumer recycled polymeric materials. According to the preferred embodiment of the invention, the high molecular weight polyolefin is a polypropylene.

Figure 4:
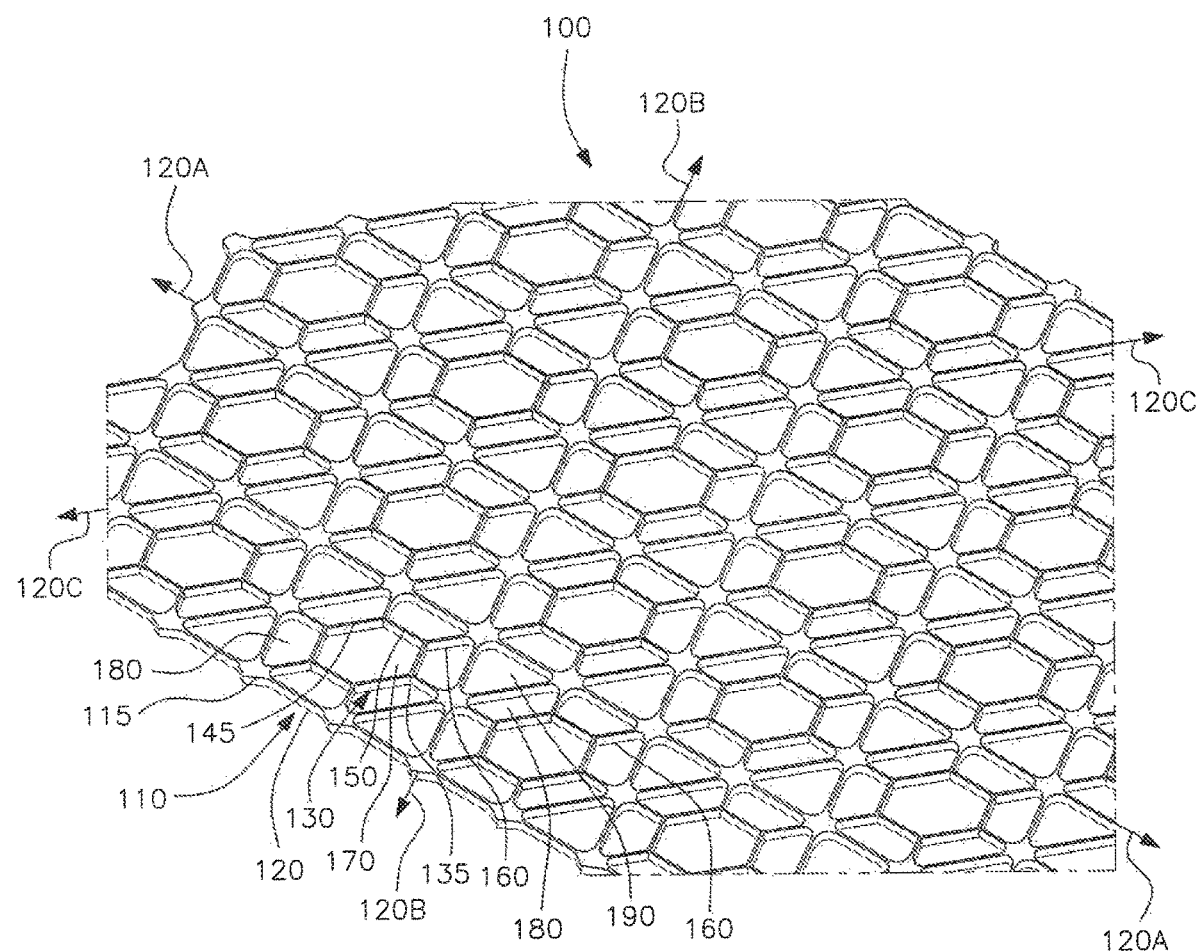
FIG. 4 is a perspective view of the multi-axial integral geogrid shown in FIG. 2.
Figure 5:
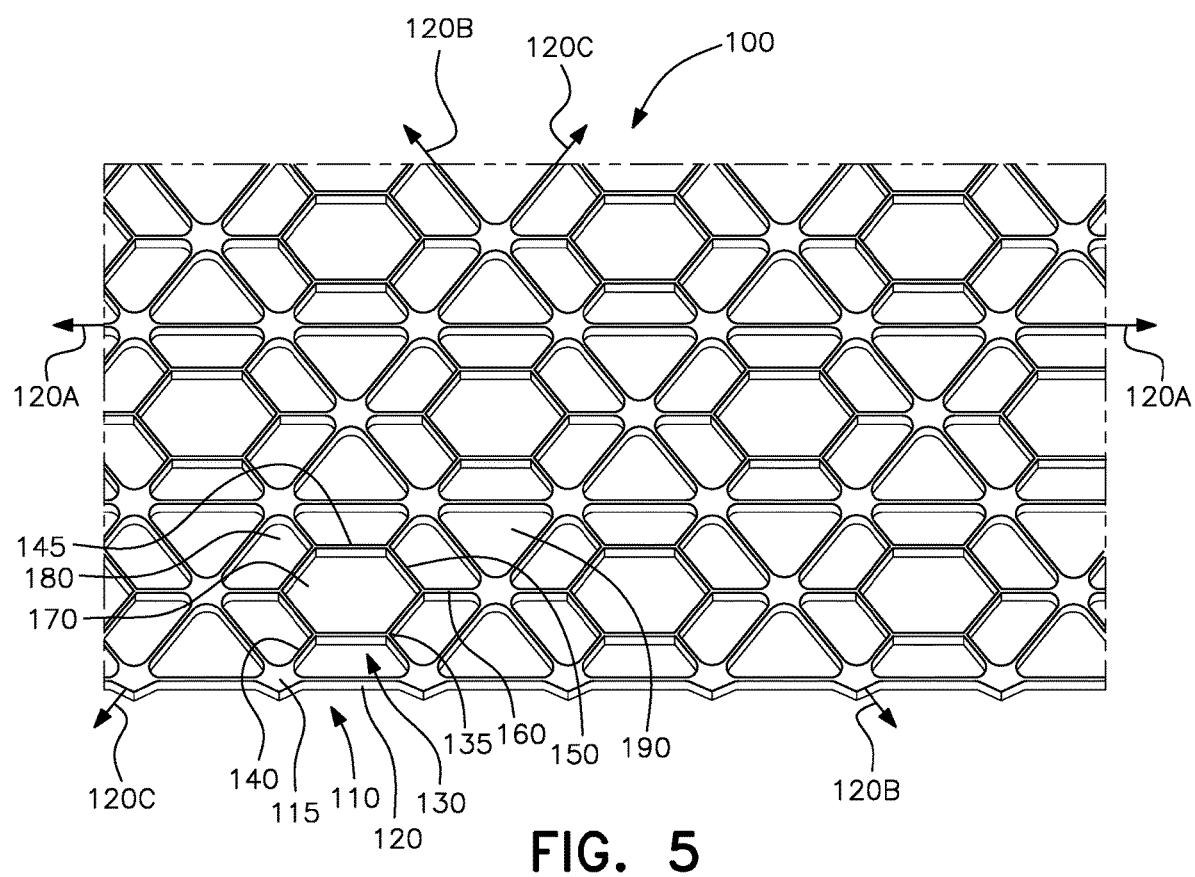
FIG. 5 is an enlarged perspective view of the multi-axial integral geogrid shown in FIG. 4 rotated counter clockwise about 30 degrees.

FIG. 4 is a perspective view of the multi-axial integral geogrid 100 shown in FIG. 2, and FIG. 5 is an enlarged perspective view of the multi-axial integral geogrid 100 shown in FIG. 4. As is evident from FIGS. 4 and 5, the strands 120, 140, 145, 150, and 160 have what is known to one skilled in the art as a high aspect ratio, i.e., a ratio of the thickness or height of the strand cross section to the width of the strand cross section that is greater than 1.0 in accordance with the aforesaid Walsh HAR patents, U.S. Pat. Nos. 9,556,580, 10,024,002, and 10,501,896. While not absolutely necessary for the present invention, a high aspect ratio for the strands or ribs is preferred. Thus, the multi-axial integral geogrid of the present invention provides enhanced compatibility between geogrid and aggregate, which results in improved interlock, lateral restraint, and confinement of the aggregate.

Figure 5A:
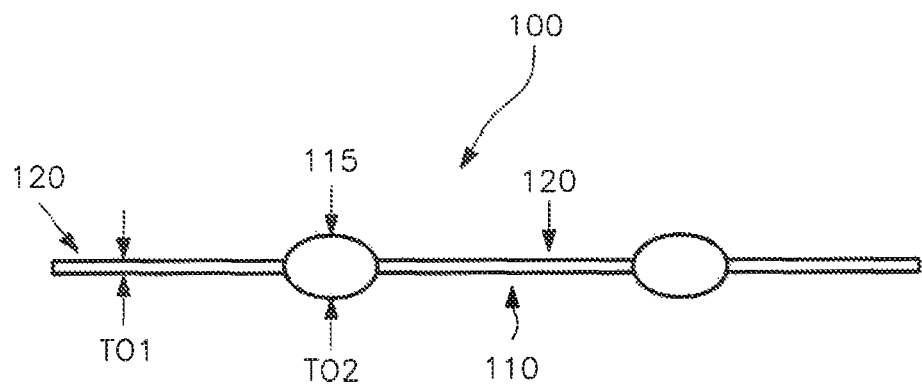
FIG. 5A is an enlarged side schematic drawing illustrating a partial section of Rib A and adjoining junctions of an outer hexagon (see FIG. 13) which form or define a part of a strong axis strand of the multi-axial integral geogrid shown in FIG. 5.
Figure 5B:
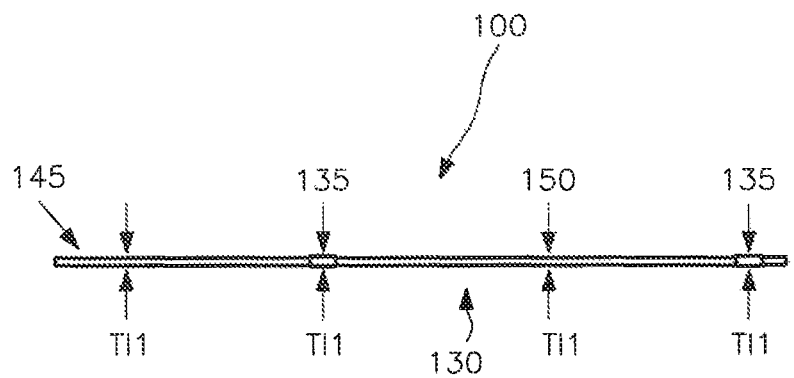
FIG. 5B is an enlarged side schematic drawing illustrating a partial section of Ribs B and D and adjacent tri-nodes of an inner hexagon (see FIG. 13) of the multi-axial integral geogrid shown in FIG. 5.

FIG. 5A is an enlarged side schematic drawing illustrating a partial section of Rib A and adjoining junctions of an outer hexagon (See FIG. 13) which form or define a part of one of three linear strong axis strands that extend continuously throughout the geogrids of the present invention. These strong axis strands provide the necessary strength and in-plane stability of the geogrids when engaging with, confining and stabilizing aggregate in civil engineering applications. FIG. 5B is a similar enlarged side schematic drawing illustrating a partial section of Ribs B and D and adjacent tri-nodes of an inner hexagon. Typical thicknesses for each of these components in accordance with the present invention are set forth in FIGS. 5A and 5B.

Figure 6:
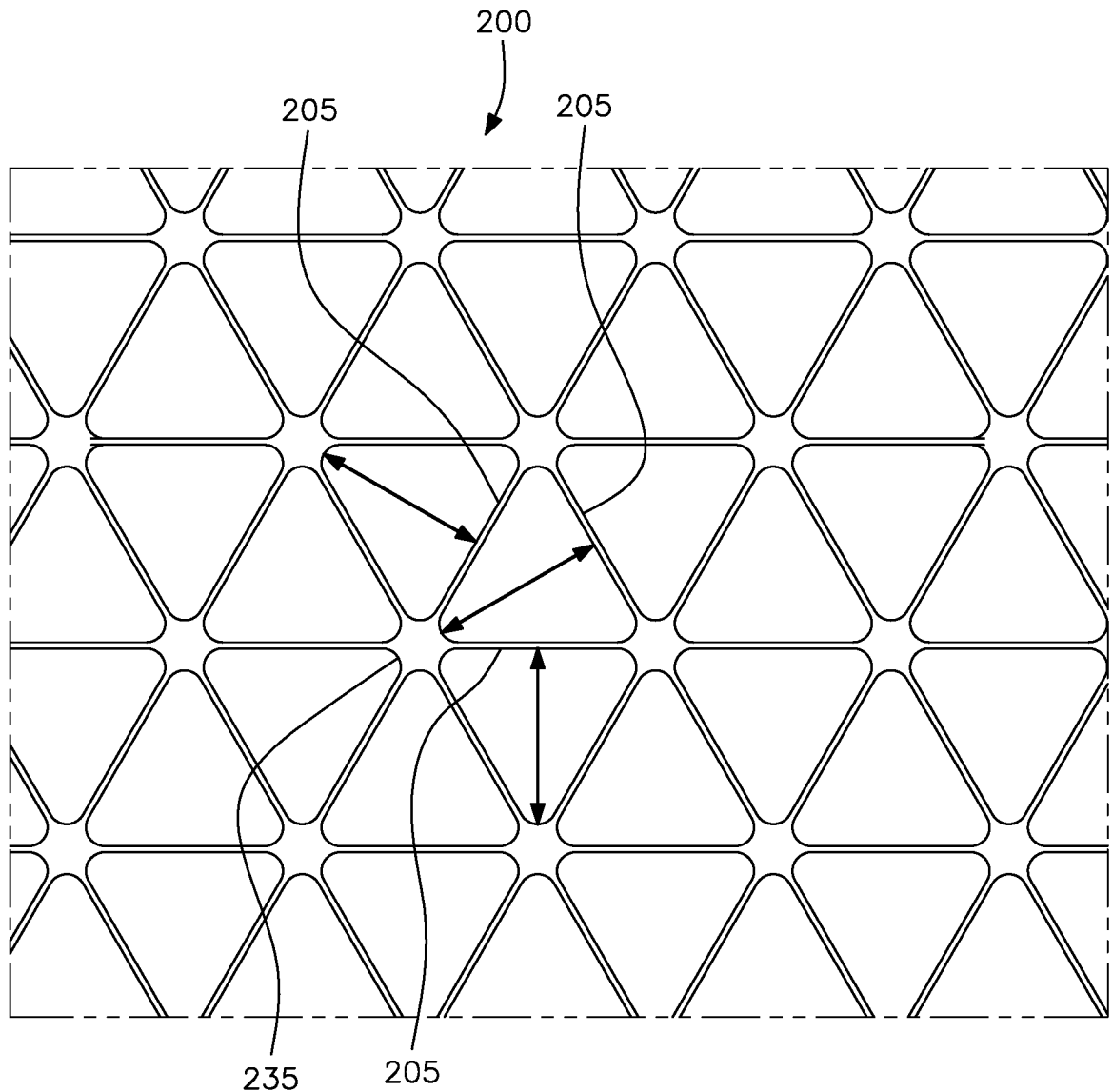
FIG. 6 is a partial plan view that illustrates structural limitations of the prior art integral geogrid shown in FIG. 1.

FIG. 6 is a partial plan view that illustrates certain structural limitations of the prior art triaxial integral geogrid shown in FIG. 1. The repeating geometric element of the conventional triaxial integral geogrid 200 has one basic opening shape—a triangle—one limiting strand dimension, and a high ratio of junctions to connecting strands, one to three. As such, the conventional triaxial integral geogrid 200 provides no variation in either opening shape or size and a single confinement angle of 60°.

Figure 7:
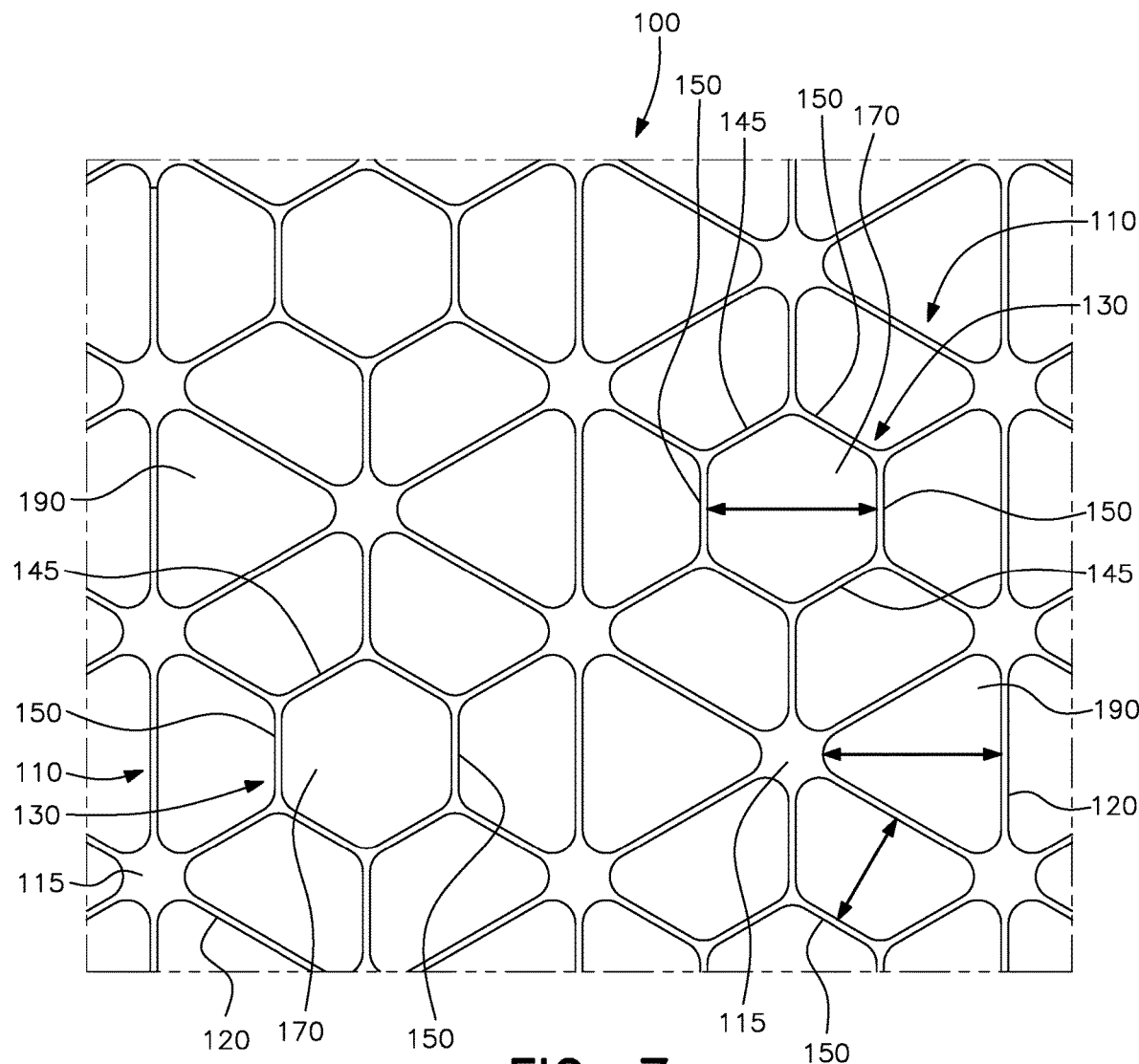
FIG. 7 is a partial plan view that illustrates structural attributes of the multi-axial integral geogrid of the present invention shown in FIG. 2.

FIG. 7 is another plan view that illustrates structural attributes of the multi-axial integral geogrid 100 as shown in FIG. 2. Again, while the prior triangular integral geogrid 200 shown in FIG. 1 has only one basic shape and one limiting strand dimension, the multi-axial integral geogrid 100 leverages three different basic opening shapes—a hexagon 110, a trapezoid 180, and a triangle 190—varying strand sizes, and two different internal confinement angles—60° and 120°. Further, the multi-axial integral geogrid 100 includes only one junction per six connecting strands, and has three strands associated with each tri-node. As such, the multi-axial integral geogrid 100 can better accommodate varying angles and orientation of aggregate as it is distributed across the geogrid.

Figure 8:
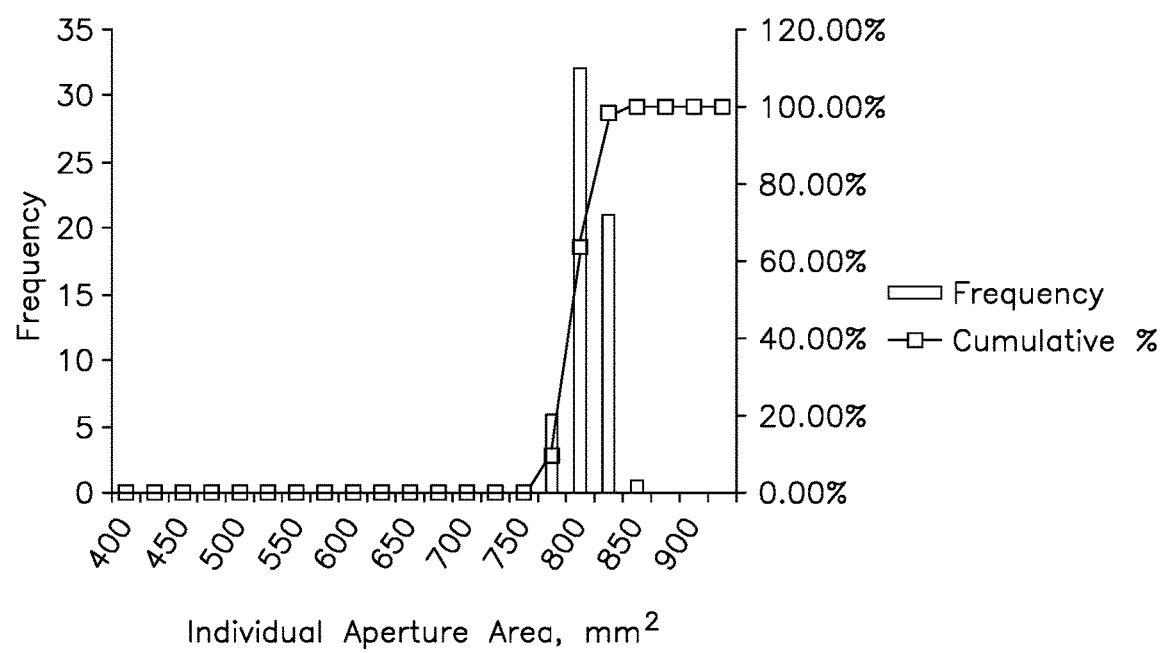
FIG. 8 is a graph that illustrates the range of distribution of individual aperture area in a prior art integral geogrid of the type shown in FIG. 1.

FIG. 8 is a graph that illustrates the range of distribution of individual aperture area in a prior art triangular integral geogrid 200 of the type shown in FIG. 1. More specifically, FIG. 8 shows the distribution of individual aperture area associated with a triaxial integral geogrid commercially available from Tensar as a TriAx® TX160® geogrid. As is evident from FIG. 8, the individual aperture area associated with a conventional triaxial integral geogrid is relatively limited, providing a range of distribution of individual aperture area only from about 775 mm$^2$ to about 850 mm$^2$, or a range of only about 75 mm$^2$.

Figure 9:
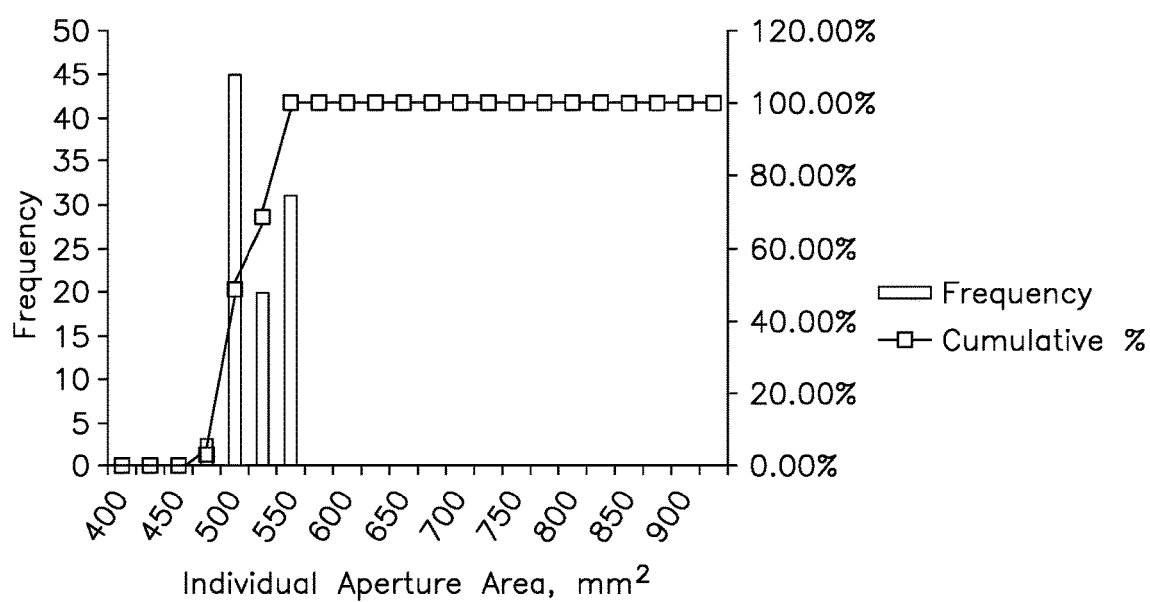
FIG. 9 is a graph that illustrates the range of distribution of individual aperture area in another prior art integral geogrid of the type shown in FIG. 1.

FIG. 9 is a graph that illustrates the range of distribution of individual aperture area in another prior art triangular integral geogrid 200 of the type shown in FIG. 1. More specifically, FIG. 9 shows the distribution of individual aperture area associated with a triaxial integral geogrid commercially available from Tensar as a TriAx® TX130S® geogrid. As is evident from FIG. 9, the individual aperture area associated with this conventional triaxial integral geogrid is also relatively limited, providing a range of distribution of individual aperture area only from about 475 mm$^2$ to about 550 mm$^2$, or a range of only about 75 mm$^2$.

Figure 10:
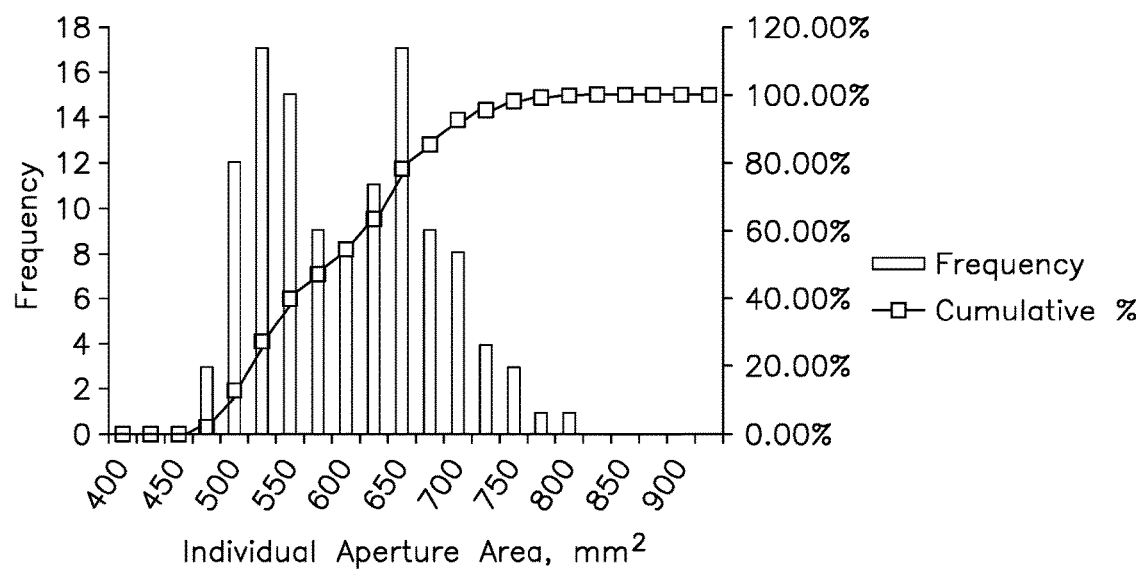
FIG. 10 is a graph that illustrates an enhanced range of distribution of individual aperture area that may be attainable with the multi-axial integral geogrid of the present invention shown in FIG. 2.

In contrast, FIG. 10 is a graph that illustrates the enhanced range of distribution of individual aperture area that may be attainable with the multi-axial integral geogrid 100 of the present invention shown in FIG. 2. As is evident from FIG. 10, the range of distribution of individual aperture area associated with the multi-axial integral geogrid 100 is substantially greater than that provided by the triaxial integral geogrid, with the wider distribution of individual aperture area from about 475 mm$^2$ to about 800 mm$^2$ providing more optimal interaction with granular materials of varying particle size, and especially pronounced between from about 500 mm$^2$ to about 700 mm$^2$, or a range of at least 200 mm$^2$.

Figure 11:
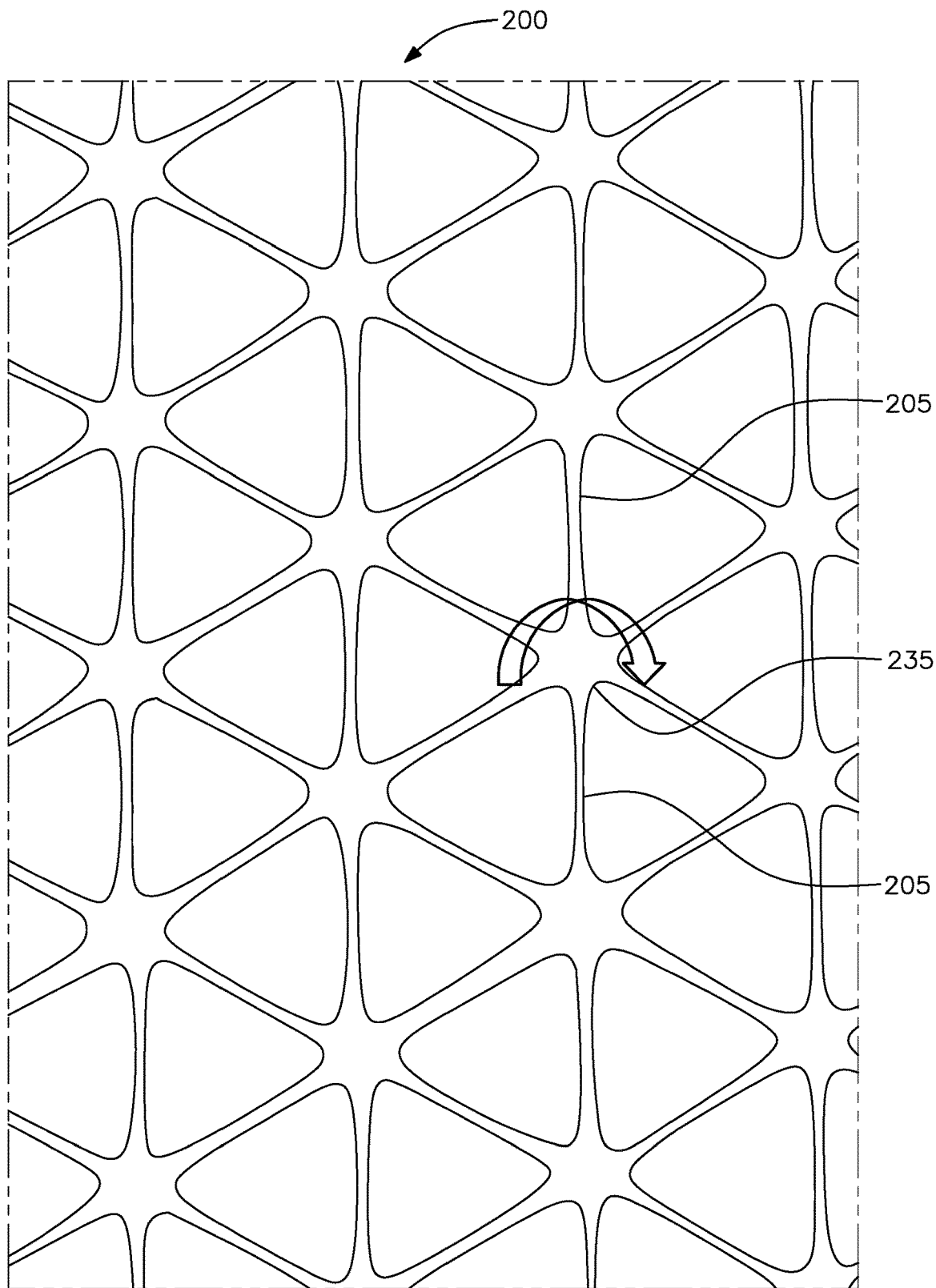
FIG. 11 is a partial plan view that illustrates the in-plane rotational stiffness of the prior art integral geogrid shown in FIG. 1.

FIG. 11 is a plan view that illustrates the in-plane rotational stiffness of the prior art triaxial integral geogrid 200 shown in FIG. 1. As is evident from FIG. 11, the prior art integral geogrid 200 has a partially oriented junction 235 that connects oriented strands 205, with each of the strands 205 having approximately the same length.

Figure 12:
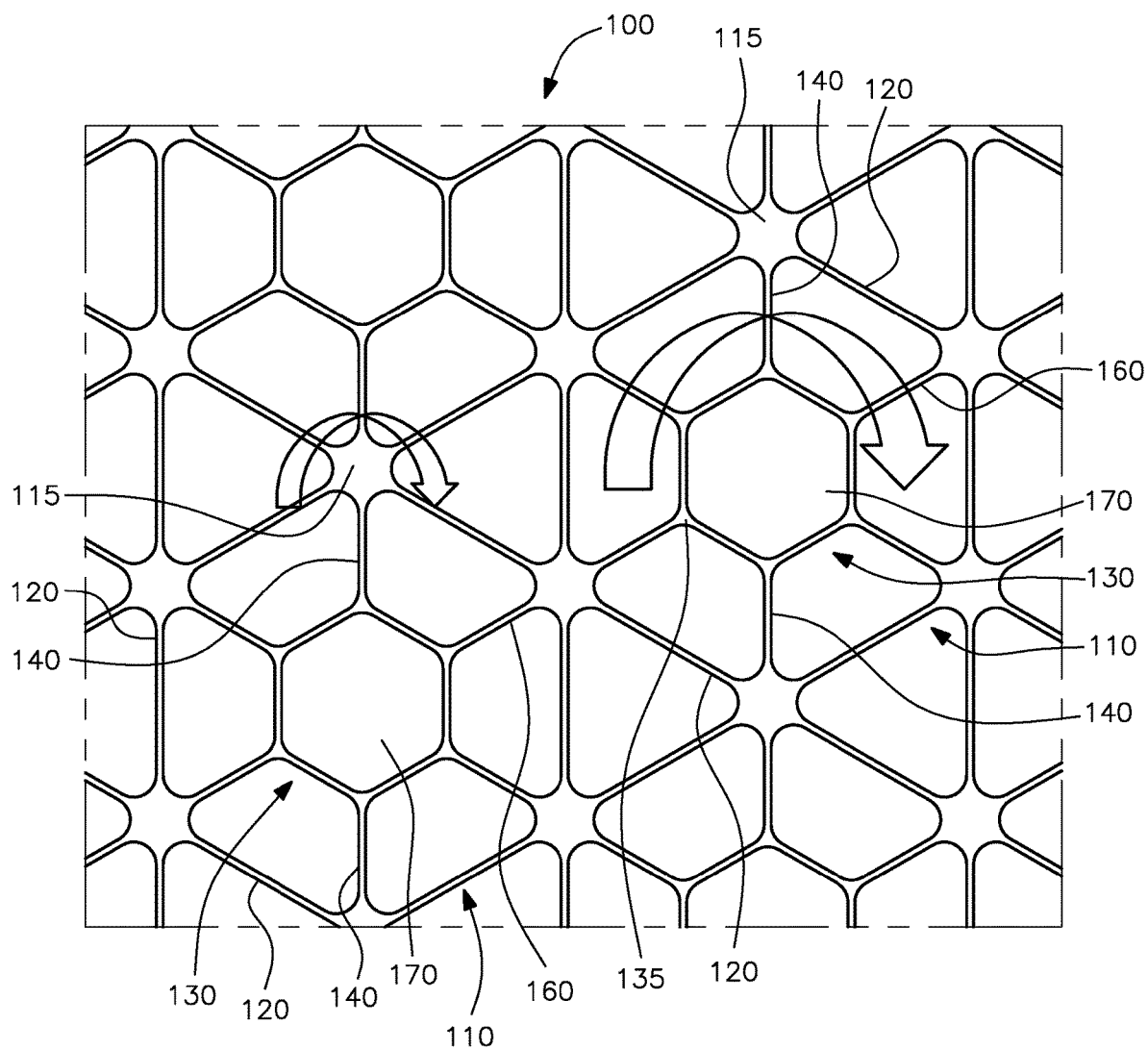
FIG. 12 is a partial plan view that illustrates the enhanced in-plane rotational stiffness that may be attainable with the multi-axial integral geogrid of the present invention shown in FIG. 2.

In contrast, FIG. 12 is a partial plan view that illustrates the enhanced in-plane rotational stiffness that may be attainable with the multi-axial integral geogrid 100 of the present invention shown in FIG. 2. Again, the multi-axial integral geogrid 100 includes the preferred repeating floating hexagon within a hexagon pattern having an outer hexagon 110 and a smaller inner hexagon 130. The outer hexagon 110 includes a plurality of oriented strands 120 interconnected by partially oriented junctions 115. The inner hexagon 130 includes a plurality of oriented strands 145 and 150 interconnected by tri-nodes 135. The outer hexagon 110 is connected to the inner hexagon 130 by a plurality of oriented supporting or connecting strands 140 and 160. By virtue of the shorter length of oriented strands 140, 145, 150, and 160 relative to the length of strands 205, the multi-axial integral geogrid 100 has increased in-plane rotational stiffness.

Figure 13:
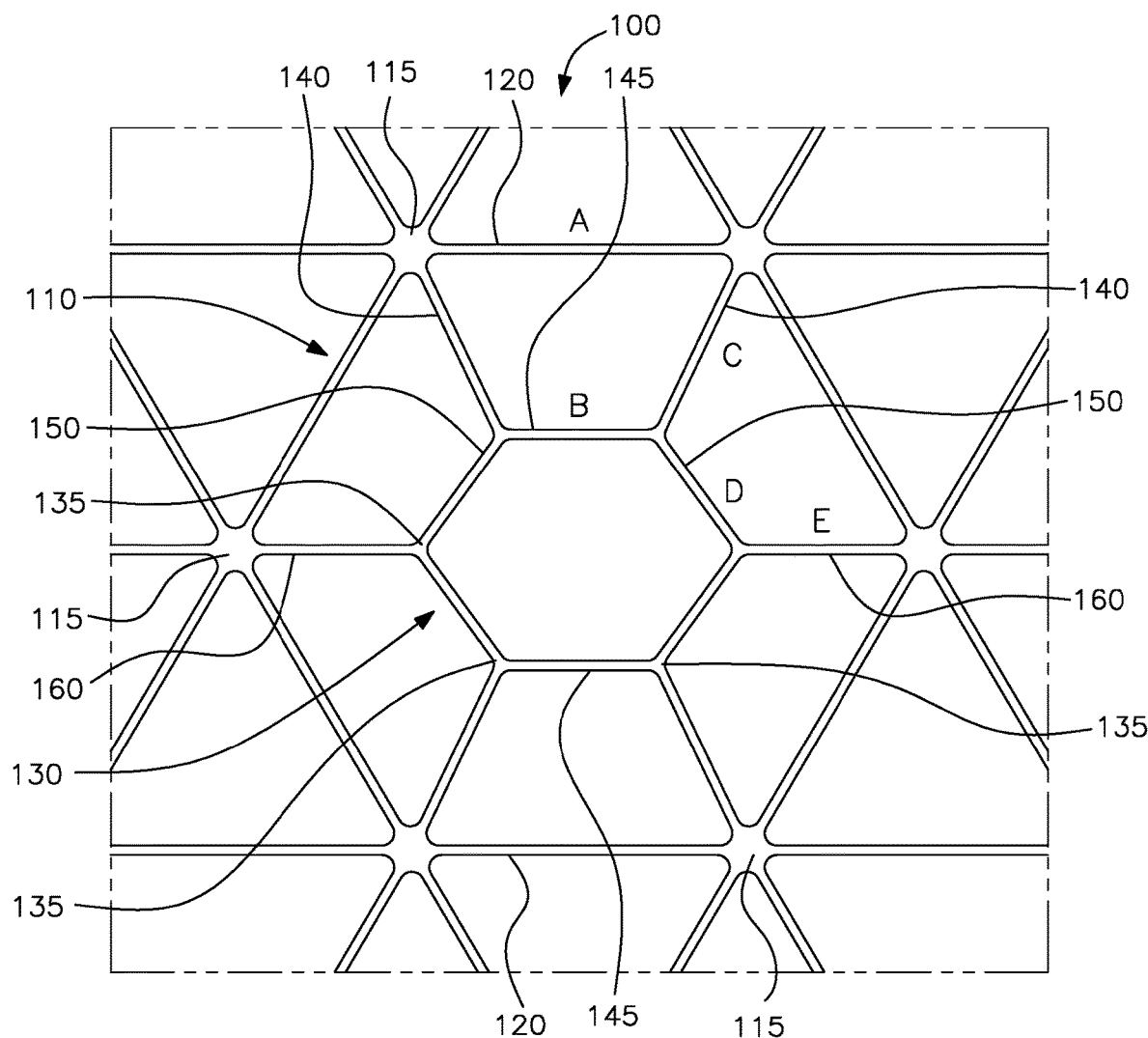
FIG. 13 is a partial plan view that illustrates the various strand lengths of the multi-axial integral geogrid of the present invention shown in FIG. 2.

FIG. 13 is a partial plan view that illustrates the various strands of the multi-axial integral geogrid shown in FIG. 2. The multi-axial integral geogrid 100 includes a repeating floating hexagon within a hexagon pattern having an outer hexagon 110 and a smaller inner hexagon 130. The outer hexagon 110 includes a plurality of oriented strands 120 (also designated by "A" in FIG. 13) interconnected by partially oriented junctions 115. The inner hexagon 130 includes a plurality of oriented strands 145 ("B") and 150 ("D") interconnected by oriented tri-nodes 135. The outer hexagon 110 is connected to the inner hexagon 130 by a plurality of oriented supporting strands 140 ("C") and 160 ("E"). (The designations A, B, C, D, and E for the various strands are employed in the data of Tables A, B and E, presented hereinafter.)

According to one embodiment of the invention, the four strands 150 (D) and the two strands 160 (E) are the widest (thickest side-to-side) and the four strands 140 (C) are the tallest, all of which provides for strength and stiffness. The two strands 145 (B) are the thinnest, which provides for out-of-plane flexibility. The strands 120 (A) are representative of TX160® strands, and these strands are neither the tallest nor the widest, neither the strongest nor the most flexible, and as such they are middle ground and inadaptable without the presence of strands B, C, D, and E. Thus, FIG. 13 illustrates the impact of multiple strand dimensions on strength and stiffness. Other embodiments and dimensional relationships will readily occur to those skilled in the art.

Table A presents the height, width, and aspect ratio of each of the various strands for one example of the multi-axial geogrid 100 of the present invention as illustrated in FIG. 13. While the values presented in Table A are representative of the height, width, and aspect ratio that may be associated with the multi-axial geogrid 100 of the present invention, they are presented for purposes of illustration, without intending to be limiting of the scope of the invention.

TABLE A

| Strand | Height (mm) | Width (mm) | Aspect Ratio |
|---|---|---|---|
| A | 2.86 | 1.12 | 2.55 |
| B | 2.05 | 1.10 | 1.86 |
| C | 3.16 | 1.11 | 2.84 |
| D | 3.13 | 1.32 | 2.37 |
| E | 2.63 | 1.29 | 2.03 |

Table B presents a comparison of aspect ratios associated with the various strands of the multi-axial integral geogrid 100 of the present invention with the aspect ratio of various commercial triaxial integral geogrids commercialized by Tensar.

TABLE B

| Strand | Invention | TX160 ® | TX180 ™ | TX130S ® |
|---|---|---|---|---|
| A | 2.55 | 1.47 | 1.62 | 1.85 |
| B | 1.86 | - | - | - |

TABLE B-continued

| Strand | Invention | TX160 ® | TX180 ™ | TX130S ® |
|---|---|---|---|---|
| C | 2.84 | - | - | - |
| D | 2.37 | - | - | - |
| E | 2.03 | - | - | - |
| Average rib aspect ratio | 2.33 | 1.47 | 1.62 | 1.85 |

As is evident from Table B, the multi-axial integral geogrid 100 has a higher aspect ratio on all strands compared to each of the conventional triaxial integral geogrids. Combined with the other features of the present invention's geometry, this higher aspect ratio provides better performance than the triaxial geogrids of the Walsh HAR patents.

Figure 15:
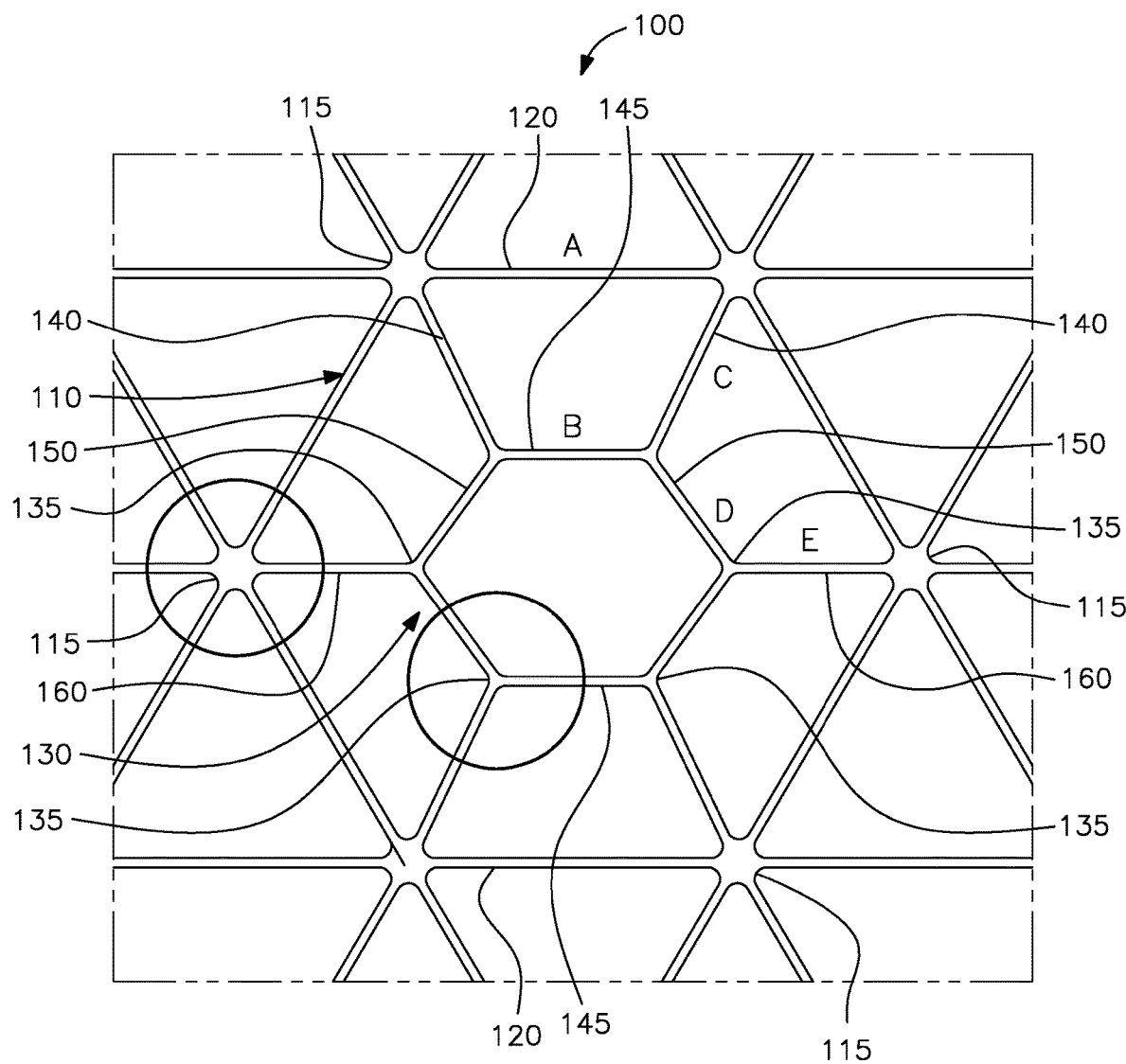
FIG. 15 is a partial plan view that illustrates the two internal angles of confinement of the multi-axial integral geogrid of the present invention shown in FIG. 2.

Broad ranges and preferred parameters for the multi-axial geogrid according to the present invention as shown in FIGS. 13 and 15 are as follows.

Rib A has a height within a broad range of from 1 mm to 4 mm, a preferred range of from 2 mm to 3 mm, and a preferred dimension of 2.86 mm. The Rib A width has a broad range of from 0.75 mm to 3 mm, a preferred range of from 1 mm to 2 mm, and a preferred dimension of 1.6 mm. The Rib A length has a broad range of from 30 mm to 45 mm, a preferred range of from 35 mm to 40 mm, and a preferred dimension of 37 mm. The Rib A aspect ratio has a broad range of from 1:1 to 3:1, a preferred range of from 1.5:1 to 1.8:1, and a preferred value of 1.7:1.

The Rib B height has a broad range of from 1 mm to 3 mm, a preferred range of from 1.5 mm to 2.5 mm, and a preferred dimension of 1.6 mm. The Rib B width has a broad range of from 0.75 mm to 3.5 mm, a preferred range of from 1 mm to 3 mm, and a preferred dimension of 1.8 mm. The Rib B length has a broad range of from 15 mm to 25 mm, a preferred range of from 18 mm to 22 mm, and a preferred dimension of 21 mm. The Rib B aspect ratio has a broad range of from 0.75:1 to 2:1, a preferred range of from 1.2:1 to 1.4:1, and a preferred value of 1.3:1.

The Rib C height has a broad range of from 1 mm to 4 mm, a preferred range of from 2 mm to 3 mm, and a preferred dimension of 2.7 mm. The Rib C width has a broad range of from 0.75 mm to 3.5 mm, a preferred range of from 1 mm to 2.5 mm, and a preferred dimension of 1.6 mm. The Rib C length has a broad range of from 15 mm to 30 mm, a preferred range of from 20 mm to 25 mm, and a preferred dimension of 23 mm. The Rib C aspect ratio has a broad range of from 1:1 to 3:1, a preferred range of from 1.5:1 to 2.5:1, and a preferred value of 1.7:1.

The Rib D height has a broad range of from 1.5 mm to 4 mm, a preferred range of from 2 mm to 3.5 mm, and a preferred dimension of 2.3 mm. The Rib D width has a broad range of from 1 mm to 4 mm, a preferred range of from 1.5 mm to 2.5 mm, and a preferred dimension of 1.5 mm. The Rib D length has a broad range of from 10 mm to 30 mm, a preferred range of from 15 mm to 25 mm, and a preferred dimension of 18 mm. The Rib D aspect ratio has a broad range of from 1:1 to 3:1, a preferred range of from 1.4:1 to 1.7:1, and a preferred value of 1.6:1.

The Rib E height has a broad range of from 1 mm to 4 mm, a preferred range of from 1.5 mm to 3.0 mm, and a preferred dimension of 1.9 mm. The Rib E width has a broad range of from 0.75 mm to 3.5 mm, a preferred range of from 1 mm to 3 mm, and a preferred dimension of 1.7 mm. The Rib E length has a broad range of from 15 mm to 30 mm, a preferred range of from 20 mm to 25 mm, and a preferred dimension of 22 mm. The Rib E aspect ratio has a broad range of from 0.75:1 to 2:1, a preferred range of from 1:1 to 1.5:1, and a preferred value of 1.3:1.

And, as shown in FIG. 5A, the outer hexagon 110 of the multi-axial integral geogrid 100 has a partially oriented junction 115 thickness (dimension "TO2") having a broad range of from 3 mm to 9 mm, a preferred range of from 4.5 mm to 7.5 mm, and a preferred dimension of about 5.6 mm, and a strand or rib 120 thickness (dimension "TO1") having a broad range of from 1 mm to 5 mm, a preferred range of from 1.5 mm to 3.5 mm, and a preferred dimension of about 2.8 mm.

In addition, as shown in FIG. 5B, the inner hexagon 130 of the integral geogrid 100 has a tri-node 135 thickness (dimension "TI1" such as, for example, 2.1 mm) and a strand or rib 145 thickness (also dimension "TI1" such as, for example, 2.0 mm) and a strand or rib 150 thickness (also dimension "TI1" such as, for example, 3.1 mm) having a broad range of from 1 mm to 5 mm, and a preferred range of from 1.5 mm to 3.5 mm.

According to one preferred embodiment of the multi-axial integral geogrid shown in FIG. 13, the "across the flats" dimension 103 (see FIG. 27B), i.e., the distance from one junction 115 of the outer hexagon (see FIG. 15) to the opposite junction 115 of the outer hexagon, is about 80 mm. And, for the same embodiment, the across the flats dimension, i.e., the distance from one tri-node 135 of the inner hexagon (see FIG. 15) to the opposite tri-node 135 of the inner hexagon, is about 33 mm.

The punch size/diameter has a broad range of from 2 mm to 7 mm, a preferred range of from 3 mm to 5 mm, and a preferred dimension of 3.68 mm. The major pitch in the first stretch direction has a broad range of from 5 mm to 9 mm, a preferred range of from 6 mm to 8 mm, and preferred dimension of 6.7088 mm. The minor pitch in the first stretch direction has a broad range of from 1 mm to 4 mm, a preferred range of from 2 mm to 3 mm, and a preferred dimension of 2.58 mm. The second major/minor pitch in the first stretch direction has a broad range of from 4 mm to 8 mm, a preferred range of from 5 mm to 7 mm, and a preferred dimension of 5.934 mm. The major pitch in the second stretch direction has a broad range of from 4 mm to 8 mm, a preferred range of from 5 mm to 7 mm, and a preferred dimension of 6.192 mm.

Figure 14:
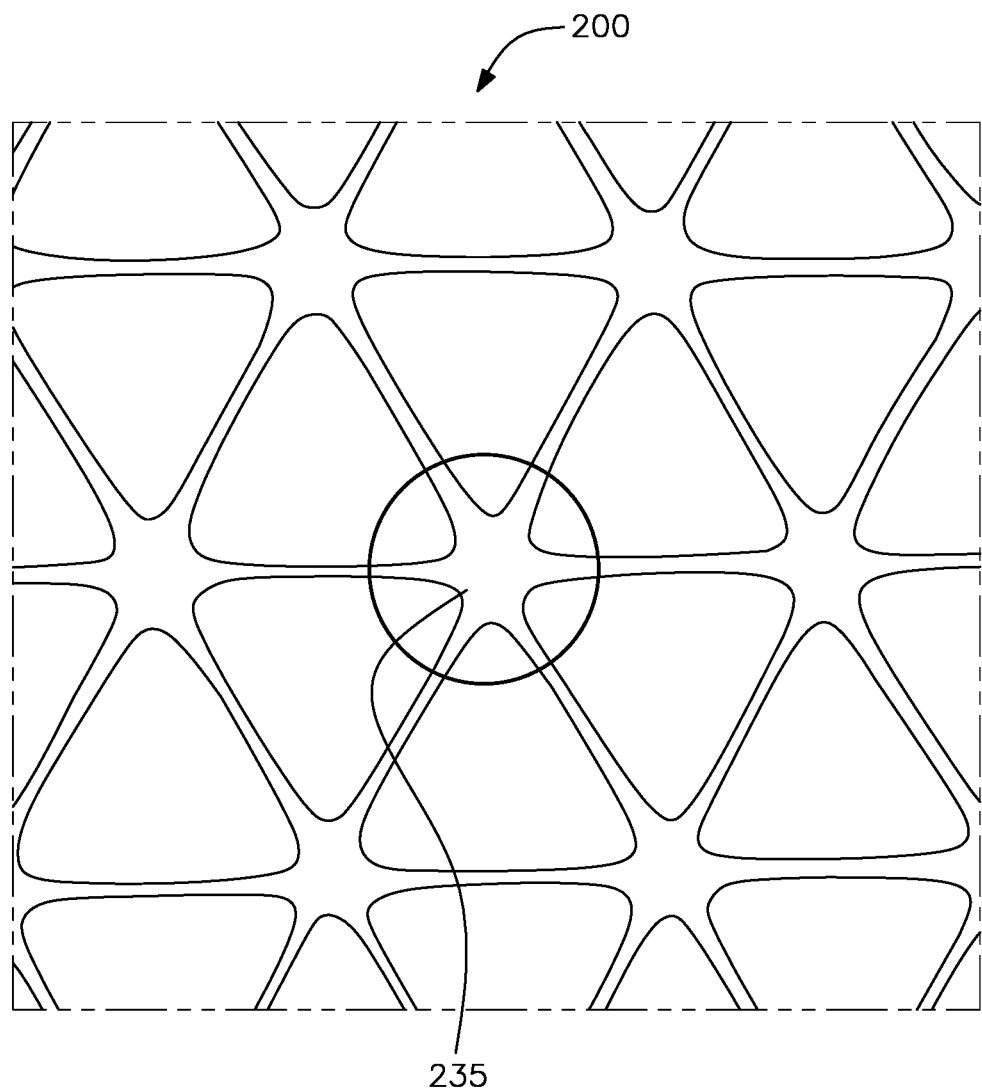
FIG. 14 is a partial plan view that illustrates the sole internal angle of confinement of the prior art integral geogrid shown in FIG. 1.

FIG. 14 is a partial plan view that illustrates the sole internal angle of confinement of the prior art triangular integral geogrid 200 shown in FIG. 1. As is evident, the integral geogrid 200 having an across the flats dimension 203 (see FIG. 27A) has a single internal angle of confinement, i.e., an angle of about 60°. That is, about each junction 235, the integral geogrid 200 has a total of six 60° angles of confinement. And, the integral geogrid 200 has a total of eighteen 60° confinement angles within the boundaries of a single hexagon. (The designation A shown in FIG. 14 is for the strand/rib of the prior art TriAx® geogrids employed in the data of Table E, presented hereinafter.)

FIG. 15 is a partial plan view that illustrates the two different internal angles of confinement of the multi-axial integral geogrid 100 of the present invention shown in FIG. 2. Advantageously, by virtue of the geometry having inner hexagon 130 supported within outer hexagon 110, and the five different strand types A, B, C, D, and E, the multi-axial integral geogrid 100 has a combination of 60° and 120° internal angles. That is, about junction 115 there are six 60° angles of confinement, and about tri-nodes 135 there are three 120° angles of confinement. And, the multi-axial integral geogrid 100 has a total of thirty confinement angles within the boundaries of a single outer hexagon 110. Thus, across its range of apertures, the multi-axial integral geogrid 100 provides two angles of confinement, leading to enhanced aggregate confinement.

Table C below presents a comparison of node orientation, tensile element orientation, open area, and average aperture open area that may be attainable with the multi-axial integral geogrid 100 of the present invention with those features of various prior art triaxial integral geogrids.

TABLE C

|  | Invention | TX160® | TX130S® |
|---|---|---|---|
| Partially oriented junctions per m² (measured and extrapolated) | 384 | 480 | 720 |
| Oriented tensile elements per m² (measured and extrapolated) | 2224 | 1424 | 2336 |
| Angles of confinement per m² | 5713 | 3015 | 5096 |
| Open Area | 85% | 85% | 87% |

As evident from Table C, when compared to TX160®, the multi-axial integral geogrid 100 of the present invention has 20% less partially oriented junctions 115 and 56% more oriented tensile elements 120, 140, 145, 150, 160 per square meter, thus providing both a significantly higher number of physical elements for aggregate particles to bear against, be confined by and interact with per unit area, and providing a significantly lower number of physical elements per unit area, i.e., partially oriented junctions, that contribute less to the geogrid's ability to engage, confine and stabilize the aggregate. Further, when compared to TX130S®, the multi-axial integral geogrid 100 of the present invention has 47% less partially oriented junctions 115 per square meter, and nearly the same amount of oriented tensile elements 120, 140, 145, 150, 160 per square meter, but a higher number of angles of confinement. These features thus provide a high number of physical elements for aggregate particles to bear against, be combined by and interact with per unit area, but with a significantly lower number of physical elements per unit area that contribute less to the geogrid's ability to engage and stabilize the aggregate.

Figure 16:
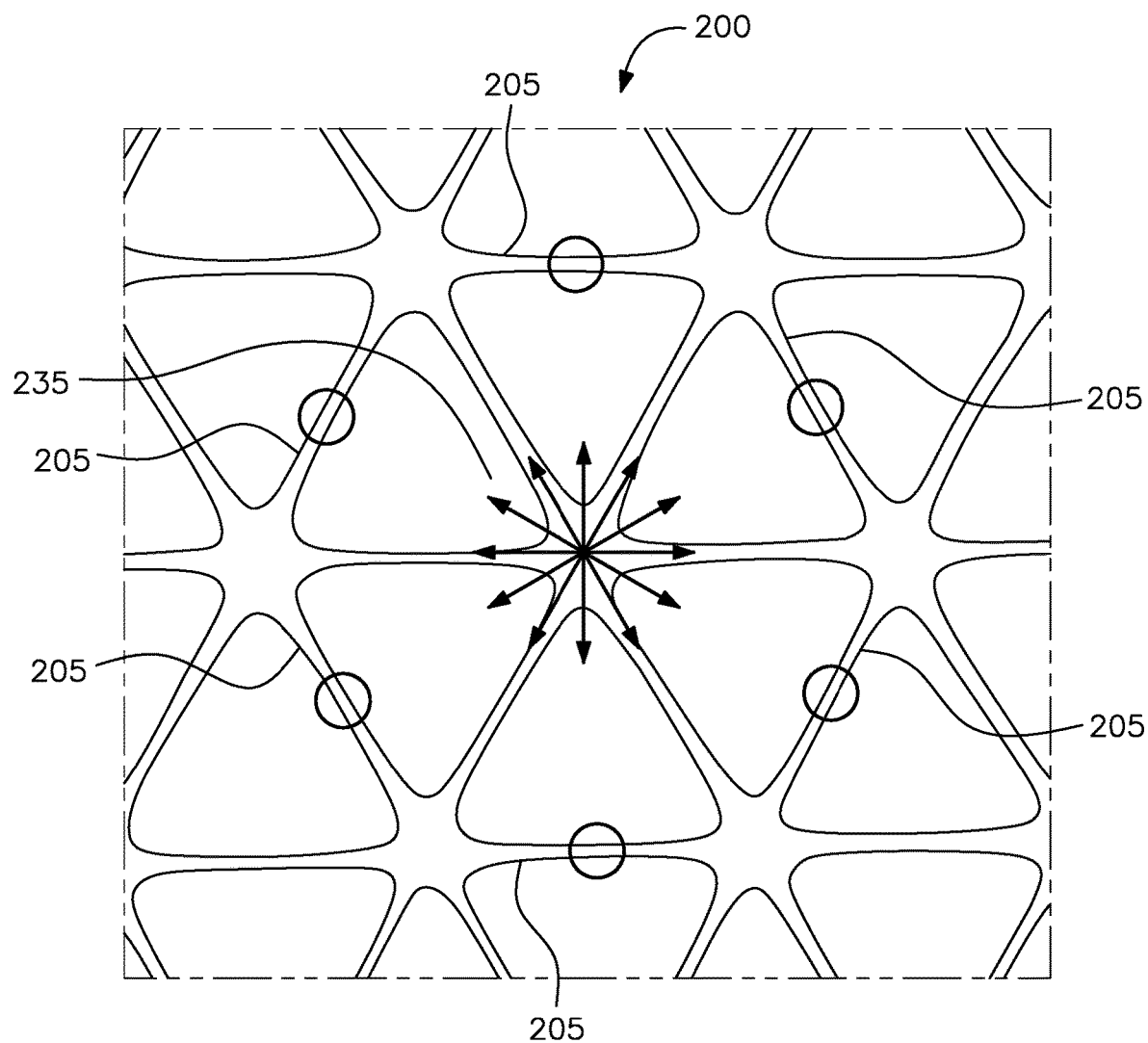
FIG. 16 is a partial plan view that illustrates the six confinement elements in a specific distance of the prior art integral geogrid shown in FIG. 1.

FIG. 16 is a partial plan view that illustrates the six confinement elements in a specific distance of the prior art triangular integral geogrid 200 shown in FIG. 1. Per FIG. 16, the prior art integral geogrid 200 has six bearing elements, i.e., the six strands 205 that surround junction 235.

Figure 17:
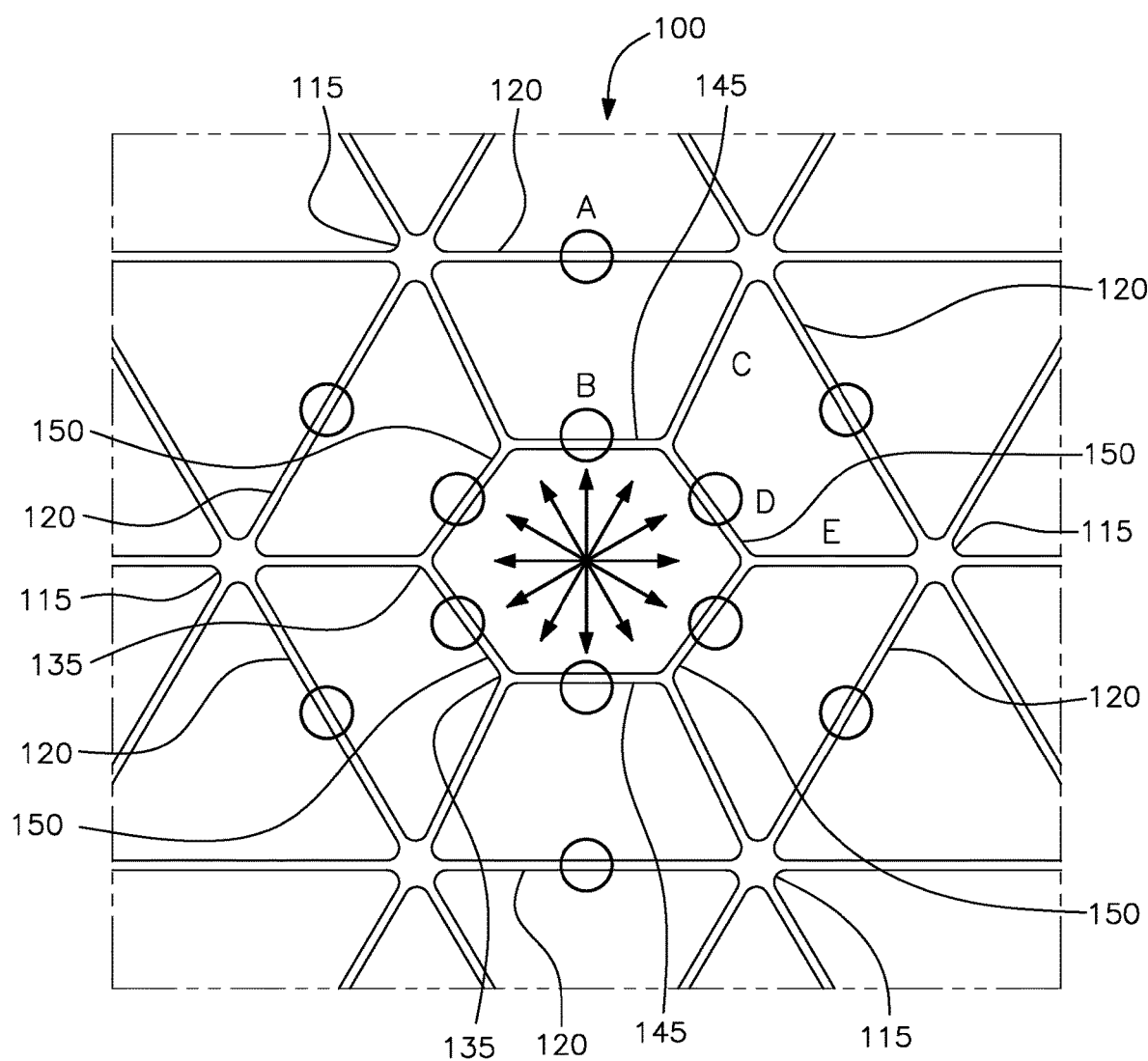
FIG. 17 is a partial plan view that illustrates the twelve confinement elements in the same specific distance of the multi-axial integral geogrid shown in FIG. 2.

FIG. 17 is a partial plan view that illustrates the twelve confinement elements in the same specific distance of the multi-axial integral geogrid 100 of the present invention shown in FIG. 2. As is evident from FIG. 17, the multi-axial integral geogrid 100 has twelve bearing (confining) elements, i.e., the six strands 120 that form outer hexagon 110, and the six strands that form inner hexagon 130, i.e., the two strands 145 and the four strands 150. That is, in a like-for-like hexagon size with similar across the flats distance 103 (see FIG. 27B), the multi-axial integral geogrid 100 provides twice as many confinement elements to bear against radial loading motion during compaction and trafficking. Thus, the multi-axial integral geogrid 100 provides twice as many elements that provide concentric-like resistance to aggregate movement.

Figure 18:
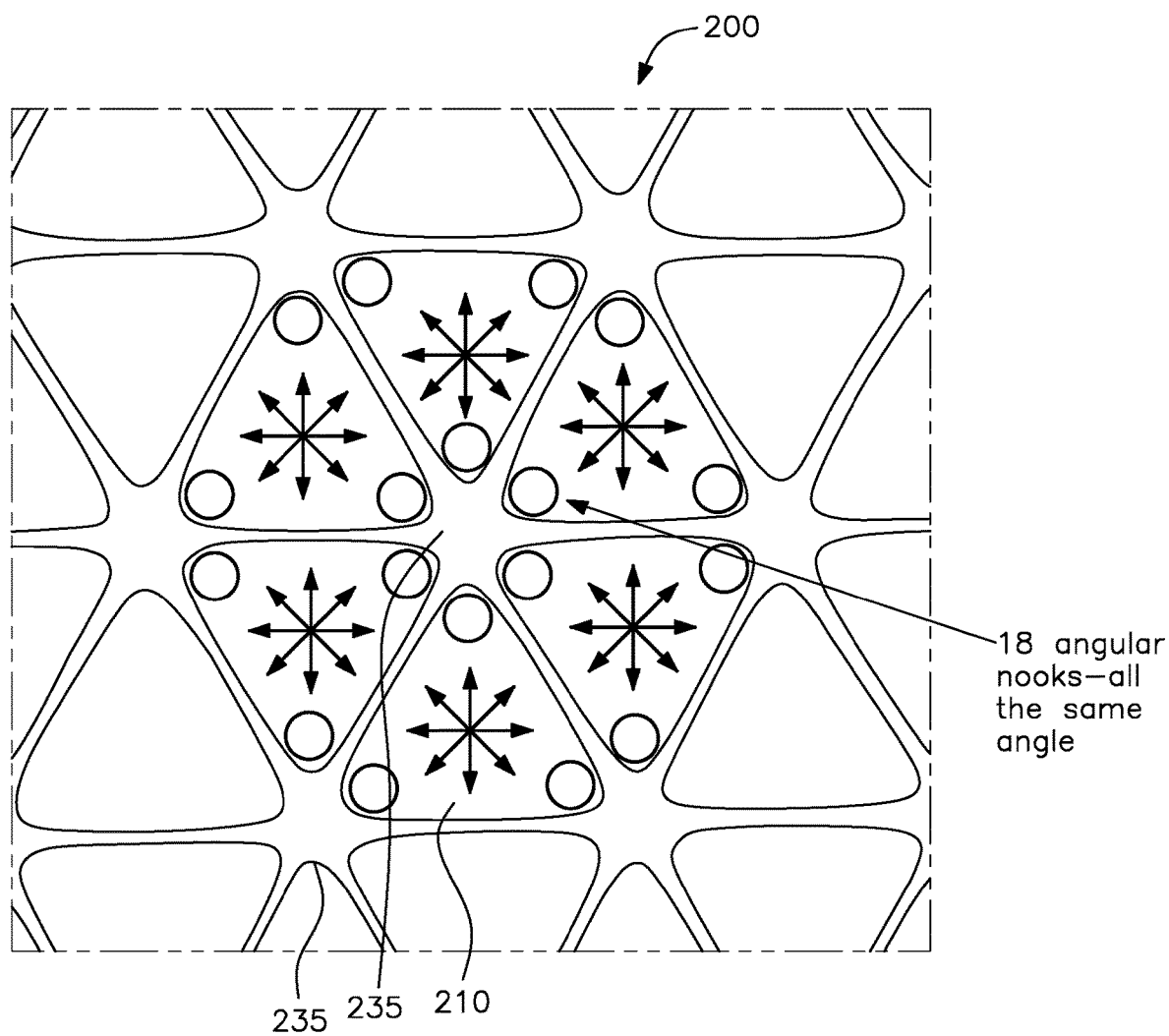
FIG. 18 is a partial plan view that illustrates the eighteen angular nooks, all of the same angle, of the prior art integral geogrid shown in FIG. 1.

FIG. 18 is a partial plan view that illustrates the eighteen angular nooks, all of the same angle, of the prior art integral geogrid 200 shown in FIG. 1. As noted above, the integral geogrid 200 having the across the flats dimension 203 (see FIG. 27A) has a single internal angle of confinement, i.e., an angle of about 60°. That is, about each junction 235, the integral geogrid 200 has a total of six 60° angles of confinement, or nooks. And, the integral geogrid 200 has a total of eighteen 60° confinement angles or nooks within the boundaries of a single hexagon.

Figure 19:
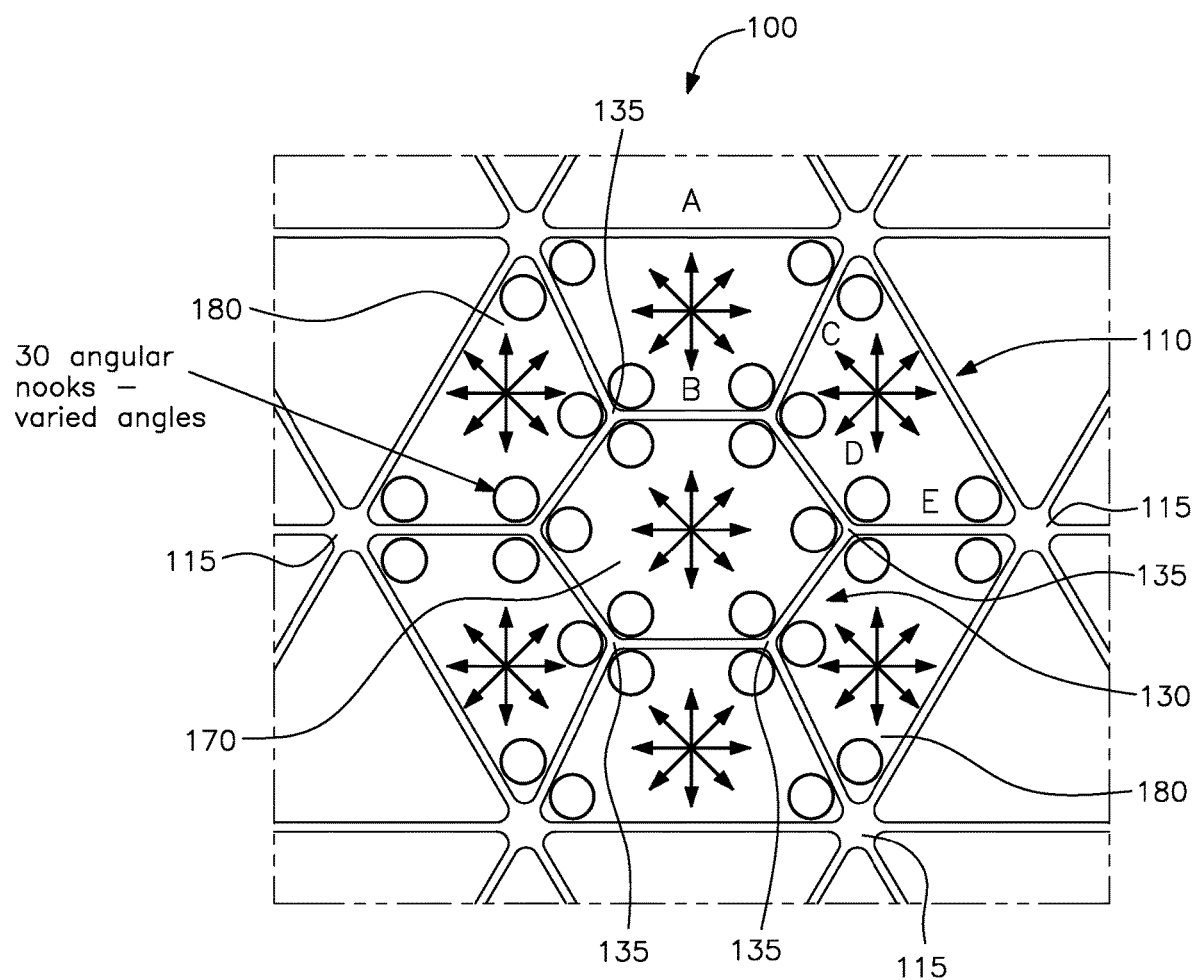
FIG. 19 is a partial plan view that illustrates the thirty angular nooks, of varied angles, of the multi-axial integral geogrid of the present invention shown in FIG. 2.

FIG. 19 is a partial plan view that illustrates the thirty angular nooks, of varied angles, of the multi-axial integral geogrid 100 of the present invention shown in FIG. 2. As noted above, by virtue of the geometry having inner hexagon 130 supported within outer hexagon 110, and the five different strand types A, B, C, D, and E, the multi-axial integral geogrid 100 has a combination of 60° and 120° internal angles. That is, about each junction 115 there are six 60° angles of confinement or nooks, and about each tri-node 135 there are three 120° angles of confinement or nooks. And, the multi-axial integral geogrid 100 has a total of thirty confinement angles or nooks within the boundaries of a single outer hexagon 110. Thus, across its range of apertures, the multi-axial integral geogrid 100 provides thirty independent (or unique) confinement angles or nooks, with two different internal angles of confinement, this combination of features leading to enhanced aggregate confinement.

Figure 20:
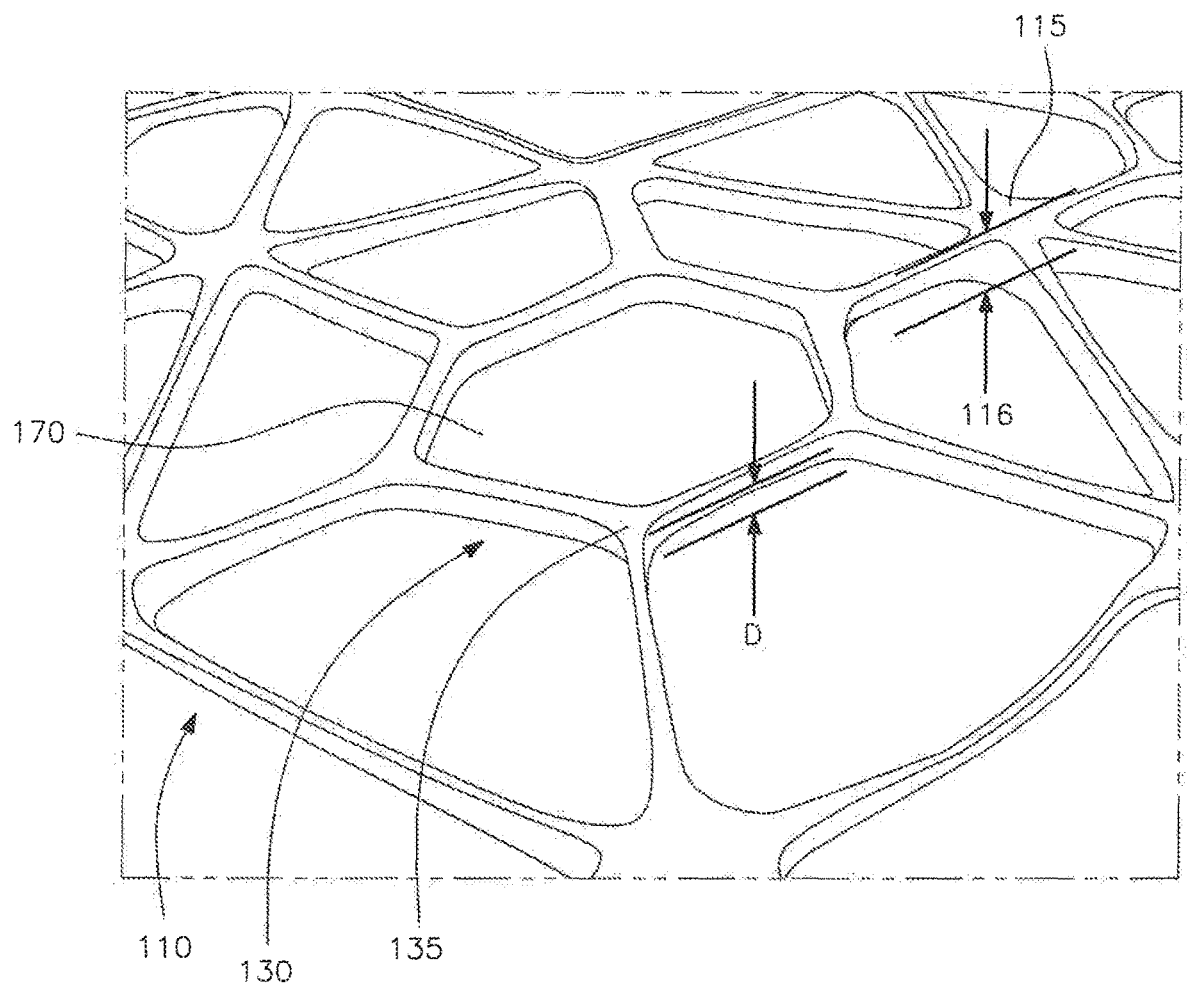
FIG. 20 is a partial perspective view that illustrates the floating nature of the inner hexagon of the multi-axial integral geogrid of the present invention shown in FIG. 2.

FIG. 20 is a partial perspective view that illustrates the preferred floating nature of the inner hexagon 130 of the multi-axial integral geogrid of the present invention shown in FIG. 2. The invention incorporates a resilient (or suspended) and adaptable inner hexagon 130, which better accommodates aggregate during compaction by varying "out of plane" stiffness. The floating inner hexagon is relatively movable in the vertical Z-axis dimension and as such allows a meaningful degree of compliance or deflection during compaction.

In a preferred embodiment of the invention, this vertical compliance or deflection of the inner hexagon 130 can be as much as about 33% of the greatest thickness of the surrounding outer hexagon 110. In other words, if the thickness 116 of the partially oriented junctions (which is the thickest component of the outer hexagon) is 6 mm, the out of plane compliance, or deflection "D," of the floating inner hexagon 130 can be as much as about 2 mm. This resilient (or suspended) compliance extends over the entire area bounded by each outer hexagon 110, the outer hexagon having a lesser degree of vertical compliance. It has been surprisingly discovered that this enhanced resilient (or suspended) compliance or deflection "D" of the inner hexagon enhances the ability of the geogrid 100 of the present invention to interlock with the aggregate.

Figure 29A:
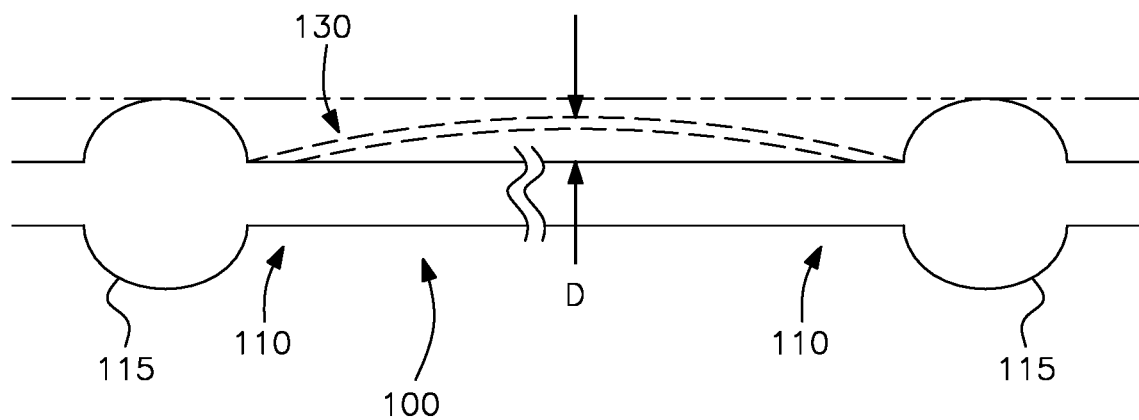
FIG. 29A is a schematic drawing illustrating the restricted out of plane upward movement of the inner hexagon within the outer hexagon according to the present invention.
Figure 29B:
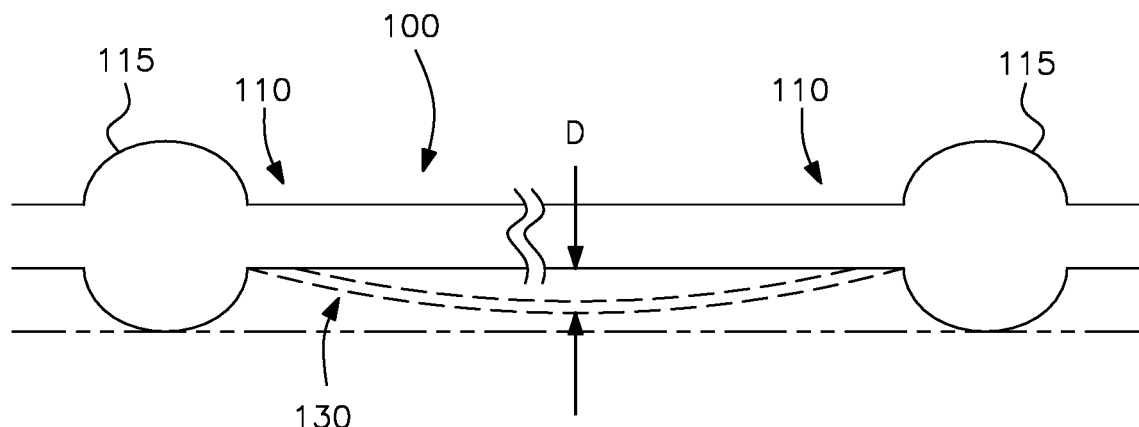
FIG. 29B is a schematic drawing illustrating the restricted out of plane downward movement of the inner hexagon within the outer hexagon according to the present invention.
Figure 30:
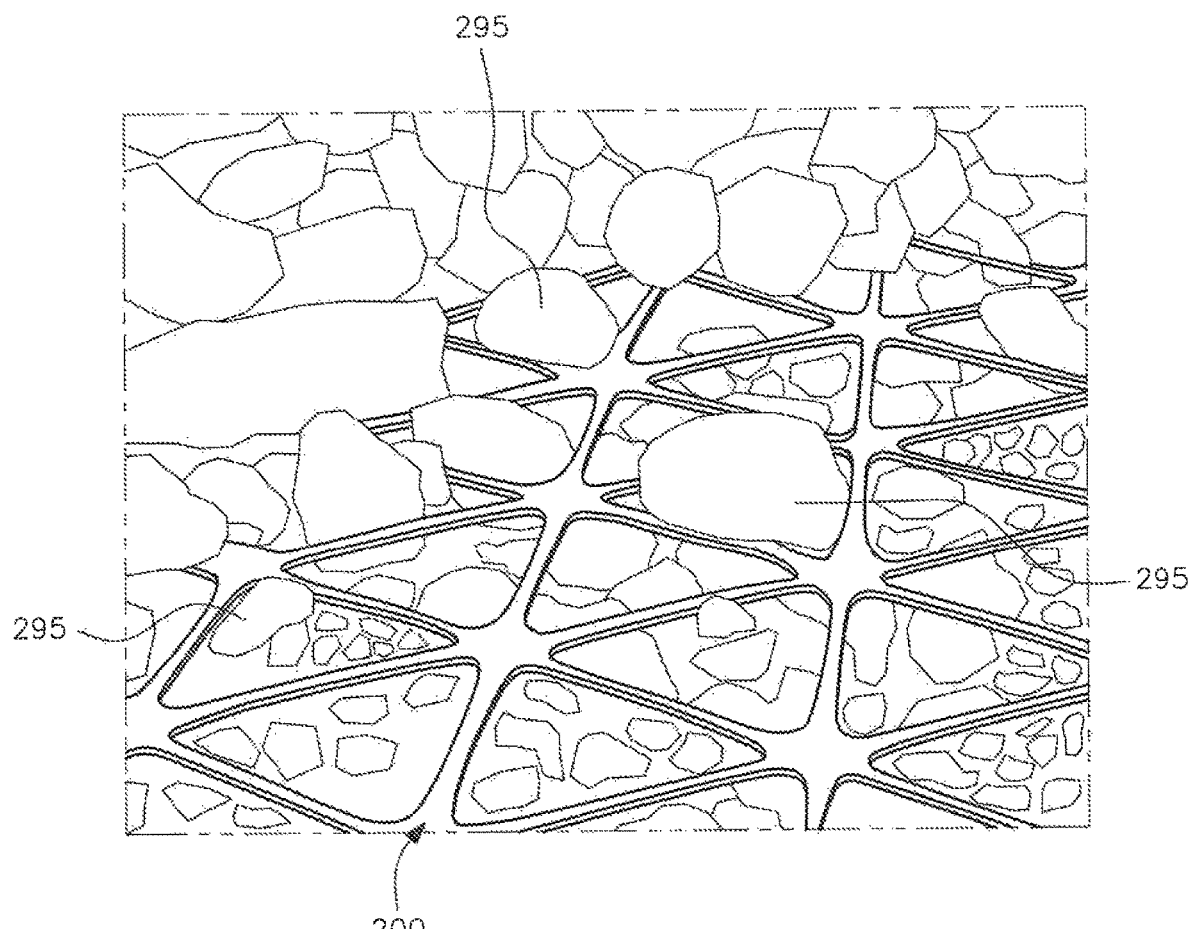
FIG. 30 is a drawing illustrating the approach of the prior art Walsh HAR patents of matching the single size of the geogrid apertures to a relatively large granular particle size.

As shown in FIG. 29A, the inner hexagon 130 of integral geogrid 100 is capable of flexing (i.e., floating or deforming) upwardly, i.e., outwardly away from the plane of the outer hexagon 110, to an extent that a distance "D" is equal to about 33% of the overall thickness of the surrounding outer hexagon 110 (with the overall thickness of outer hexagon 110 being essentially the thickness of junctions 115). Correspondingly, as shown in FIG. 29B, the inner hexagon 130 of integral geogrid 100 is capable of flexing (i.e., floating or deforming) downwardly, i.e., outwardly away from the plane of the outer hexagon 110, to an extent that a distance "D" is equal to about 33% of the overall thickness of the surrounding outer hexagon 110.

Moreover, the tendency for this resilient (or suspended) and adaptable inner hexagon 130 to sit above the subgrade and even to deflect further vertically upward if the subgrade is uneven provides the opportunity for improved lateral restraint and impedes aggregate from rolling over the strands 140, 145, 150, 160 when subjected to repeated loading, with the outer hexagon 110 creating a second ring of confinement for aggregate to have to pass over. A conventional prior art multi-axial geogrid, like geogrid 200, lacks this level of resilient (or suspended) compliance, and as such provides only one level of confinement.

Figure 21:
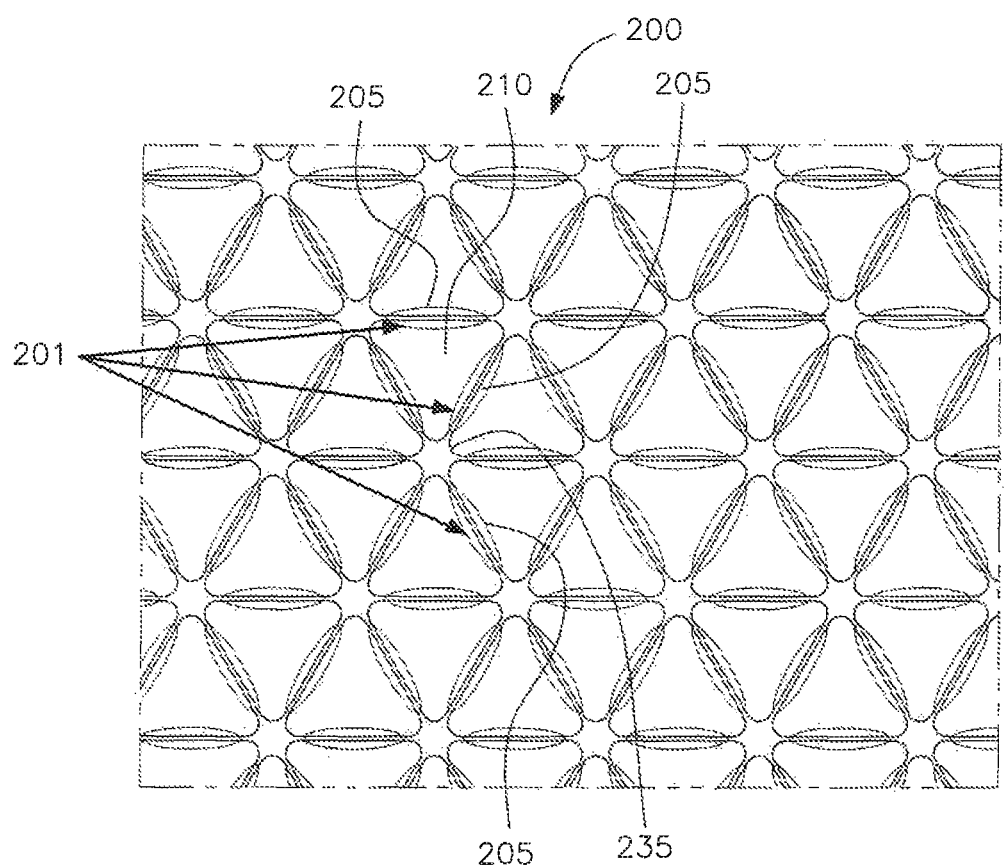
FIG. 21 is a partial plan view that illustrates the localized zones of lower compliance associated with individual strands or ribs of the prior art integral geogrid shown in FIG. 1.

FIG. 21 is a partial plan view that illustrates the localized zones of lower compliance 201 associated with individual strands or ribs 205 of the prior art integral geogrid 200 shown in FIG. 1. That is, because the individual strands or ribs 205 connect the partially oriented junctions 235, the prior art integral geogrid 200 has numerous localized zones of lower compliance 201, and thus minimal resiliency.

Figure 22:
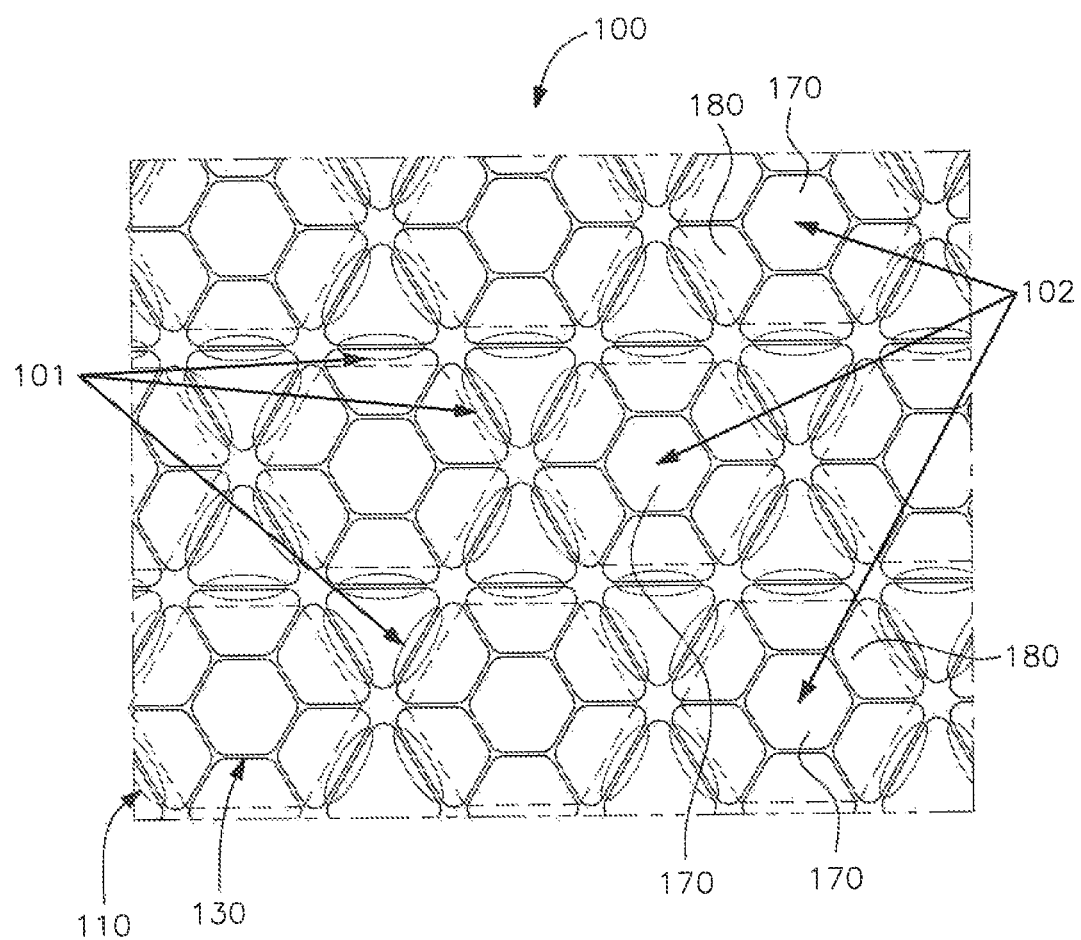
FIG. 22 is a partial plan view that illustrates the localized zones of lower compliance associated with individual strands or ribs of the outer hexagon, and the repeating zones of high resilient compliance of the inner hexagon, of the multi-axial integral geogrid of the present invention shown in FIG. 2.

FIG. 22 is a partial plan view that illustrates the localized zones of lower compliance 101 associated with individual strands or ribs 120 of the outer hexagon 110, and the repeating zones of high resilient compliance 102 of the inner hexagon 130, of the multi-axial integral geogrid 100 of the present invention shown in FIG. 2. By virtue of the ability of the floating inner hexagon 130 to deflect vertically within outer hexagon 110, the multi-axial geogrid 100 has a repeating zone of high resilient compliance 102 within each of the corresponding outer hexagons 110.

To repeat, as illustrated in FIG. 21, a conventional prior art tri-axial geogrid lacks the level of compliance over such a large area that characterizes the multi-axial integral geogrid of the present invention. As such, any compliance associated with the prior art triaxial geogrid is restricted to individual ribs which are constrained by the junctions located at either end. In contrast, per unit area, the geogrid of the present invention has an area of significant vertical resilient (or suspended) compliance in the order of about 50% to about 75% as shown in FIG. 22. This contrasts with a conventional prior art multi-axial geogrid, as shown in FIG. 21, which has no such zones of significant vertical compliance.

In one aspect of the present invention, the geogrid 100 represents a horizontal mechanically stabilizing geogrid. The repeating pattern of outer hexagons 110 including a plurality of outer oriented strands or ribs 120 interconnected by partially oriented junctions 115 comprise strong axis strands which extend continuously in a linear path throughout the geogrid as indicated by lines 120A, 120B, and 120C in FIG. 4. As will be noted from FIG. 4, the strong axis strands formed by outer oriented strand or ribs 120 interconnected by partially oriented junctions 115, as indicated by lines 120A, 120B and 120C in the FIG. 4, extend continuously throughout the entirety of the geogrid without intersecting inside an outer hexagon. This feature provides the necessary strength and stability for the geogrids of the present invention. In another aspect, the ribs 140, 160 which extend inwardly from the partially oriented junctions 115 and connect with the tri-nodes 135 of the floating inner hexagon 145, or other geometric configuration described hereinafter, which is supported by such ribs comprise "engineered discontinuities" or "floating engineered discontinuities".

The invention also relates to a method of making the above-described multi-axial integral geogrid 100. The method includes providing a polymer sheet 300; providing a patterned plurality of holes or depressions 310 in the polymer sheet 300; and orienting the polymer sheet 300 having the patterned plurality of holes or depressions 310 therein to provide a plurality of interconnected, oriented strands 120, 140, 145, 150, and 160 having an array of openings 170, 180, and 190 therein, a repeating floating hexagon 130 within an outer hexagon 110 pattern of the interconnected, oriented strands and the openings, including three linear strands that extend continuously throughout the entirety of the multi-axial integral geogrid 100.

In general, once the polymer sheet 300 has been prepared with holes or depressions, the multi-axial integral geogrid 100 can be produced from the sheet 300 according to the methods described in the above-identified prior art patents and known to those skilled in the art.

As indicated above, the hexagonal geometric shape of the outer hexagon 110 and smaller inner hexagon 130 are a preferred embodiment for providing the floating geometric configuration of the present invention. However, other geometric shapes are possible within the scope of the present invention. For example, the geometric shapes could be rectangular or square with four supporting or connecting strands connecting each inner corner of the outer rectangle or square to the corresponding outer corner of the smaller inner rectangle or square. Or, the geometric shapes could be triangular with only three supporting or connecting strands between adjacent inner corners of the outer triangle and outer corners of the smaller inner triangle. Other polygon shapes are also contemplated within the scope of the present invention.

In the rectangular or square embodiment of the present invention, described in the preceding paragraph, there would preferably be two linear strands defined by interconnected oriented strands and partially oriented junctions that extend continuously throughout the entirety of the geogrid for each outer rectangle or square, such continuous strands extending at an angle of approximately 90° from each other. In the triangular embodiment, there would preferably be three such linear strands for each outer triangle which extend from each other by approximately 120°, similar to linear strands 120 of the preferred hexagon embodiment described in detail herein.

Also, different geometric shapes could be possible without departing from the present invention. For example, the inner geometric shape could be a circular ring supported within the preferred outer hexagon shape with six supporting strands similar to the preferred embodiment disclosed herein. Thus, it is intended that the geometric shapes of the outer repeating structure and the inner or interior floating structure not be limited to identical geometric forms.

As described above and illustrated in the accompanying drawings, the geogrid embodiments disclosed herein comprise a monolayer structure; therefore, the composition of the starting sheet 300 illustrated in and described in the connection with FIG. 3 is comprised of a single polymer or copolymer.

While the preferred embodiment of the integral geogrid 100 has been described above with the outer hexagons 110 surrounding and supporting smaller floating inner hexagons 130, the present invention also contemplates that the outer hexagons 110 can surround and support smaller inner hexagons 130 which do not float or flex (deform), but rather remain in the plane of the geogrid. Therefore, in accordance with the present invention, the integral geogrids 100 shown in FIGS. 2, 4 and 5, and made with the starting sheet material shown in FIG. 3, can be made to have smaller inner hexagons which do not float or flex. Thus, the repeating hexagon within a hexagon pattern of the present invention is the same whether the inner hexagon 130 is able to float or not.

Lastly, it is clearly preferred that each of the outer hexagons 110 of the multi-axial integral geogrid 100 include the floating hexagon 130 within its interior thereof as disclosed in this application. On the other hand, it is possible by changing some individual punch patterns, or otherwise, to produce a multi-axial integral geogrid in which the hexagons 130 are surrounded and supported in only a portion of the outer hexagons 110, and the other outer hexagons support a different interior structure, such as included in the prior art, without departing from the scope and intent of the present invention. So long as such modified integral geogrid includes one or more outer hexagons 110 which surround and support a floating or non-floating smaller inner hexagon 130, and define the requisite arrays of substantially parallel linear strands that extend continuously throughout the entirety of the geogrid, i.e., strong axis strands in accordance with the disclosure contained herein, it is presently believed that such modified integral geogrid falls within the scope of the present invention.

As indicated in the "Related Art" section above, prior art geogrids utilize the concept of having apertures that are large enough to cause most of the aggregate particles to physically "fall into" the open space of the apertures. The geogrid then provides benefit by laterally constraining these particles as/when load is applied from above. As load is applied from above, the aggregate particles try to move down and out (laterally), and the geogrid prevents both from happening. As such, the fundamental premise of the prior art geogrids is that the aggregate particles need to "strike through" or "penetrate" the apertures. This strike through concept of the prior art is confirmed by the Walsh HAR patents whereby the high aspect ratio concept of tall/thin ribs to promote "confinement" provides even better resistance to the lateral spreading of the aggregate.

In contrast, the present invention has converted every other junction along the non-continuous strands into an open hexagon or other open geometric configuration. This unique configuration generates at least two meaningful changes. First, the present invention has created an aperture structure where a junction was present thereby introducing a "confining element" where there was a "non-confining element". In the preferred embodiment, the aperture formed by the inner hexagon includes the creation of six ribs that form the hexagon, and these ribs are now available to interact with and support the aggregate, whereas the replaced junction is only a "point of connection" for the geogrid itself. Second, the present invention has reduced the aperture size for the six (6) trapezoidal apertures shown in FIGS. 2 and 17, as compared to the triangular apertures of the triaxial geogrids shown in FIGS. 1 and 16, to better retain and confine a wider range of aggregate sizes and quality.

Figure 25A:
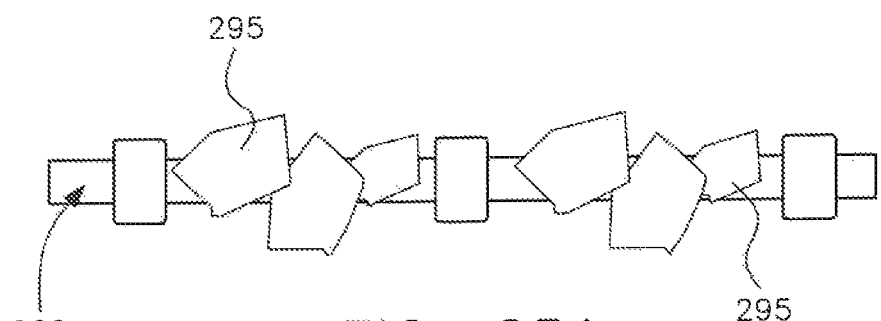
FIG. 25A is a drawing illustrating how the apertures of the prior art geogrids are large enough for the selected aggregate particles to physically "fall into" the open spaces of the apertures.
Figure 25B:
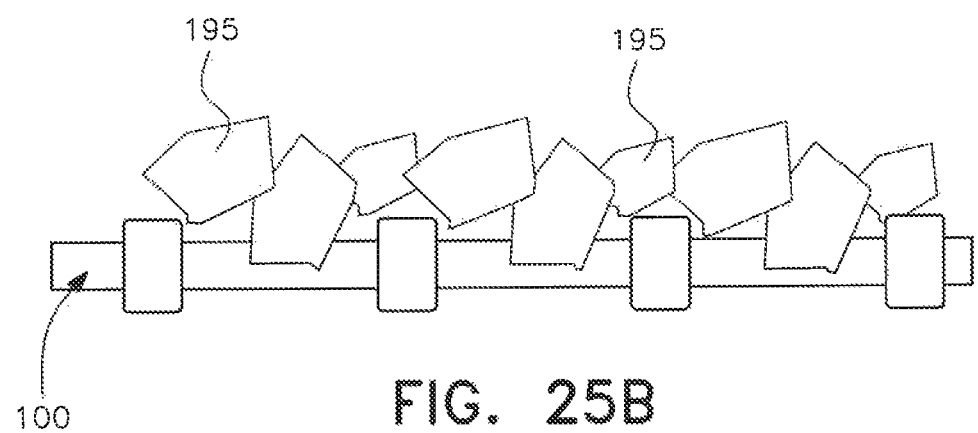
FIG. 25B is a drawing illustrating how the geogrids of the present invention serve to retain the aggregate along the upper surface of the geogrid, in contrast to prior art geogrids.

As such, it has been surprisingly discovered that the "goal" of an improved geogrid in accordance with the present invention is not to have most the aggregate particles fall into the apertures, as previously embodied in the prior art. Rather, as demonstrated by the test results reported hereinafter, the geogrid configurations of the present invention create more functional elements in the geogrid per unit area than with the prior art structures (see Table C above), and it is a goal of the present invention not to have particles fall through the apertures but rather to have more of the aggregate particles partially penetrate into more apertures. This surprisingly new interaction between the geogrid 100, 200 and the aggregate particles 195, 295, respectively, to be confined therein for the present invention versus the prior art is illustrated by the comparative drawings of FIGS. 25A and 25B.

The foregoing surprising discoveries are demonstrated by the following tests and results therefrom.

Test Methods for Examples

Test 1—Retention

The performance of a multi-axial geogrid for improving interaction with a granular material was evaluated using a small scale test to simulate granular material being "cascaded" onto the geogrid following the installation methods outlined in published guidance (e.g., "Tensar Installation Guideline IG/TriAx," Oct. 19, 2020). This small scale test comprises an open box on which a specimen of geogrid approximately 350 mm×350 mm is clamped above the open box. Then 2 kg of granular material graded to between 20 mm and 40 mm particle size is cascaded across the geogrid by a "brushing" action. A 20 mm to 40 mm particle grading is experimentally representative of a grading commonly used in constructing civil engineering structures, while removing excess variability associated with smaller or larger particle sizes. For each test, measurement is taken of the amount of granular material "captured" by the geogrid and the amount of granular material falling through the geogrid into the box below. A comparison is made of the two results. A geogrid better designed to "capture" the granular material will retain more granular material on the geogrid and allow much less material to fall into the open box beneath the geogrid specimen. Typical comparison is made on the basis of 10 repeated tests for each geogrid type, using the same 2 kg batch of granular material.

Test 2—Rutting

The performance of a multi-axial geogrid for resisting rutting due to vehicle traffic was evaluated using a small scale test to simulate well-established field tests such as the one described in Webster, S. L.; "Geogrid Reinforced Base Course for Flexible Pavements for Light Aircraft: Test Section Construction, Behavior Under Traffic, Laboratory Tests, and Design Criterial," *Report DOT/FAA/RD*-92, December 1992. The small scale test was designed to reproduce the results of well-established field tests for traffic performance of multi-axial geogrids and comprises a test section consisting of an underlying clay subgrade, a single layer of geogrid, and a compacted granular sub base. The test section is subjected to the load of a single weighted wheel. The wheel traverses the test section along a single horizontal path, constantly reversing direction from one end of the test section to the other. A control test with no geogrid present will fail rapidly under such testing. For example, after 1000 passes or less of the wheel on an unreinforced test section, a deep rut will be formed. By using properly designed multi-axial geogrids as reinforcement, decreased amounts of rutting depth will occur for a given number of wheel passes compared to the unreinforced test section. This decreased rut depth has an impact on the lifetime of the civil engineering structure and can extend this lifetime by factors of up to 50 times that of an unreinforced structure. Hence, a roadway or other civil engineering structure reinforced in accordance with the present invention will have increased longevity and decreased maintenance requirements.

The aforesaid small scale test used in connection with the present invention is the same small scale test as described in the Walsh HAR patents (See U.S. Pat. No. 10,501,896, at col. 10, lines 43-67) and which generated the data reported therein.

Example—Test 1 (Retention)

The performance of a multi-axial geogrid for improving interaction with a granular material was evaluated using a small scale test to simulate granular material being "cascaded" onto the geogrid following the installation methods outlined in published guidance.

A sample of a commercially available prior art TriAx® geogrid 200 (see FIG. 23A) had a 2000 g batch of granular material 295, graded between 20 mm and 40 mm particle size, cascaded across its surface. The material falling through the geogrid 200 into the box 296 below was weighed, as was the material retained upon the geogrid. This test was repeated 10 times for the same specimen and the same 2000 g batch of granular material was used in each repetition.

Figure 23C:
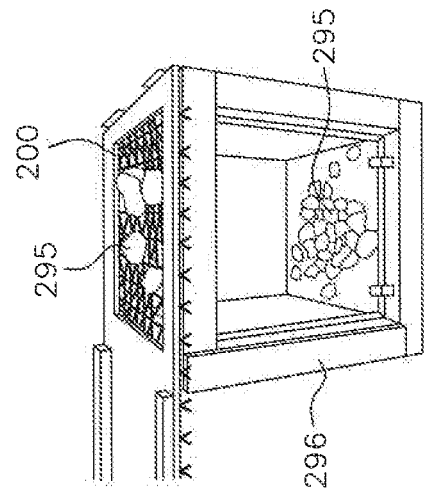
FIG. 23C is the third of the series of three (3) schematics showing the test box, granular material and TriAx® geogrid used in the retention test for which results are reported in Table D.
Figure 23B:
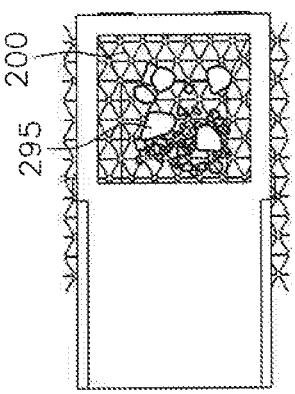
FIG. 23B is the second of the series of three (3) schematics showing the test box, granular material and TriAx® geogrid used in the retention test for which results are reported in Table D.
Figure 23A:
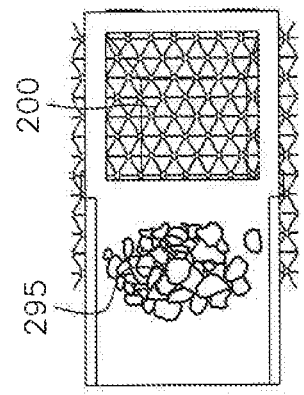
FIG. 23A is the first of a series of three (3) schematics showing the test box, granular material and TriAx® geogrid used in the retention test for which results are reported in Table D, set forth hereinafter.
Figure 23F:
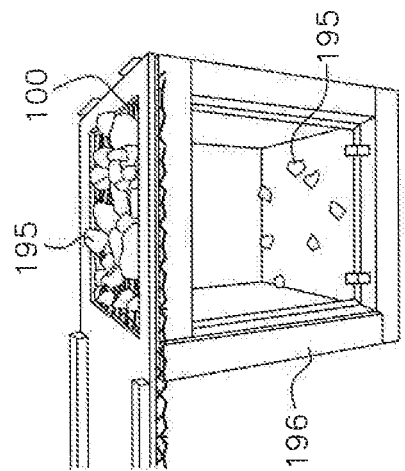
FIG. 23F is the third of the series of three (3) schematics showing the test box, granular material and a specimen of the present invention, identified as the Lab 79, used in the retention test for which results are reported in Table D.
Figure 23E:
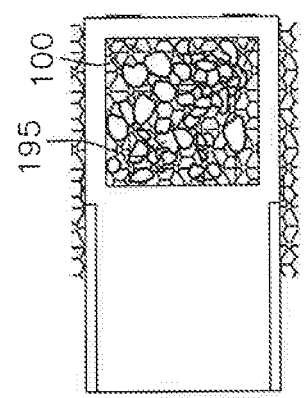
FIG. 23E is the second of the series of three (3) schematics showing the test box, granular material and a specimen of the present invention, identified as the Lab 79, used in the retention test for which results are reported in Table D.
Figure 23D:
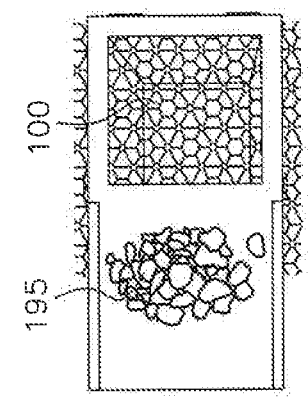
FIG. 23D is the first of a series of three (3) schematics showing the test box, granular material and a specimen of the present invention, identified as the Lab 79, used in the retention test for which results are reported in Table D, set forth hereinafter.

This experiment was then repeated for a specimen of the multi-axial integral geogrid 100 of the present invention, identified as Lab 79 (see FIG. 23B). Lab 79 was made from the same sheet material recipe as the prior art TriAx® geogrid 200 already tested. The same 2000 g batch of granular material 195 was used for assessing Lab 79 that was used to assess the prior art TriAx® geogrid.

The results are shown in Table D below:

TABLE D

| Mass of Granular Material Passing Through Geogrid, grams | | Mass of Granular Material Retained on Geogrid, grams | |
| --- | --- | --- | --- |
| Prior Art TriAx ® | Invention Lab 79 | Prior Art TriAx ® | Invention Lab 79 |
| 1732 | 47 | 268 | 1953 |
| 1659 | 136 | 341 | 1864 |
| 1698 | 68 | 302 | 1932 |
| 1702 | 98 | 298 | 1902 |
| 1814 | 42 | 186 | 1958 |
| 1758 | 103 | 242 | 1897 |
| 1690 | 53 | 310 | 1947 |
| 1682 | 79 | 318 | 1921 |
| 1712 | 76 | 288 | 1924 |
| 1770 | 73 | 230 | 1927 |
| 86% passed through on average | 4% passed through on average | Retained 14% on average | Retained 96% on average |

The results shown in Table D above indicate that the combined effect of all the geometrical elements of the multiaxial geogrid 100 of the present invention greatly improve its ability to interact with the same granular material when compared to the prior art multi-axial geogrid. While the prior art geogrid only retained or captured 14% of the material cascaded across its surface with the remaining 86% falling through the geogrid, the geogrid of the present invention captures 96% of the granular material, with only 4% falling through into box 296. This very large improvement in the ability of the geogrids according to the present invention to interact with granular material is beneficial in improving resistance to rutting in trafficking testing.

Figure 26A:
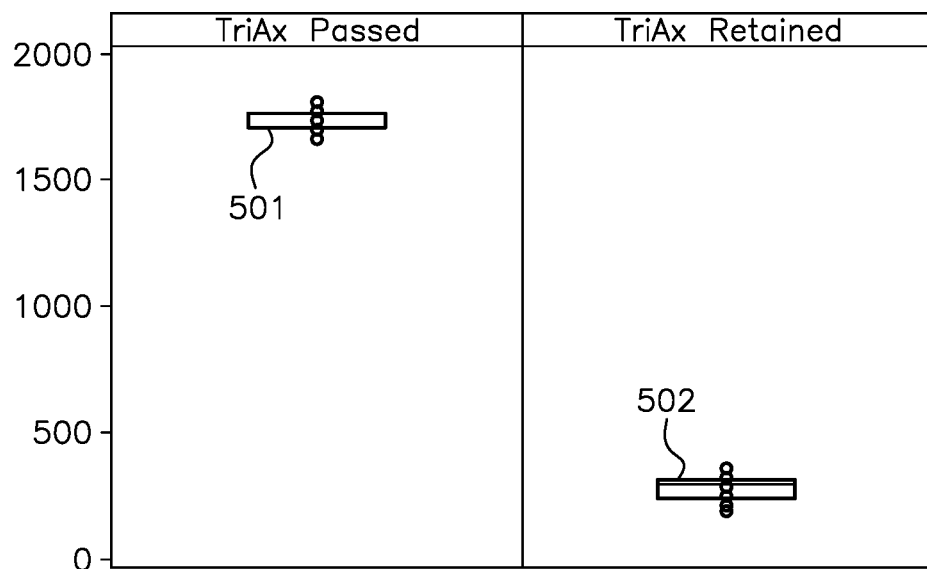
FIG. 26A is a box plot of the results of the retention test for the TriAx® geogrids as shown in the photographs of FIG. 23A.
Figure 26B:
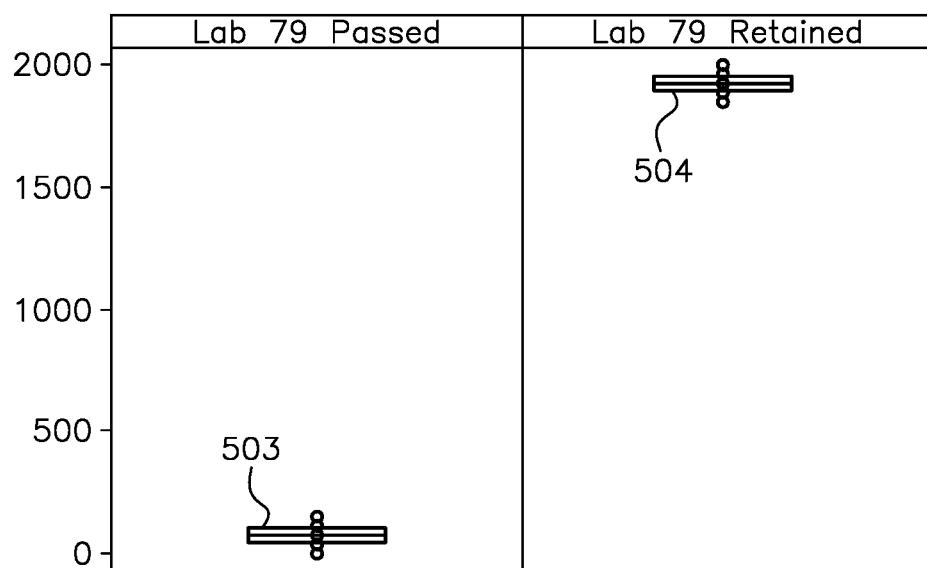
FIG. 26B is a box plot of the results of the retention tests for geogrids of the present invention, as shown in the photographs of FIG. 23B.

The test results reported in Table D are also shown in the Box Plots shown in FIGS. 26A and 26B. As can be seen in FIG. 26A, a very large proportion of the 2000 g batch of granular material, as indicated by the test plots at 501, passed through the TriAx® geogrid, and only a small proportion, as indicated by the plot test at 502, was retained on the geogrid. In dramatic contrast, as shown in FIG. 26B, only a small proportion of the same 2000 g batch of granular material passed through the geogrid of the present invention, as indicated by the test plots at 503, whereas almost all of the aggregate was retained, as indicated by the test plot at 504.

In accordance with the present invention, it has been surprisingly discovered that the ability of the geogrid "to retain" the aggregate in a standard retention test is a better predictor than the "strike through/penetration" concept employed by the prior art. More specifically, it is believed at the present time that for any particular aggregate a retention by the geogrid of at least 50% in the aforedescribed retention test should predict an effective geogrid in a composite structure comprising that tested geogrid and tested aggregate. More preferably, the retention test should show greater than 75% retention, and more preferably at least 90% or more.

Example—Test 2 (Rutting)

The performance of a multi-axial geogrid for resisting rutting due to vehicle traffic was evaluated using a small scale test to simulate well-established field tests.

Figure 27A:
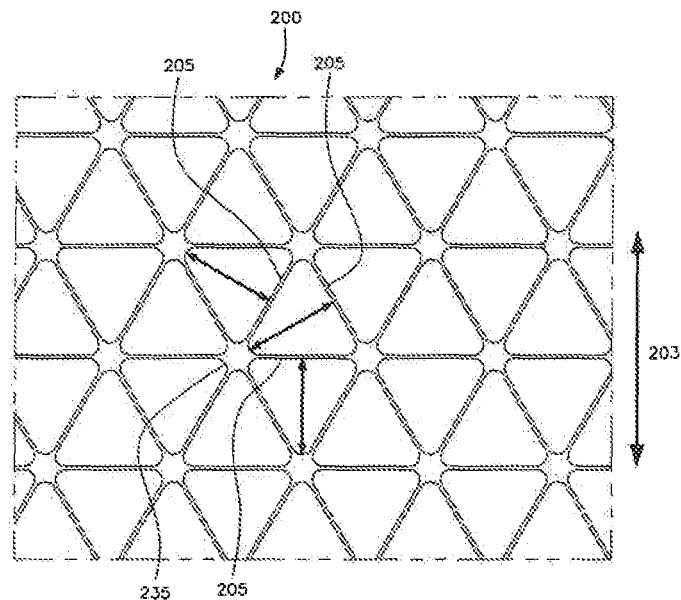
FIG. 27A is a reproduction of FIG. 6 illustrating the nominally same hexagon "across the flats" (A/F) dimension for the samples used in TEST 2 (Rutting) and the results reported in Table E.
Figure 27B:
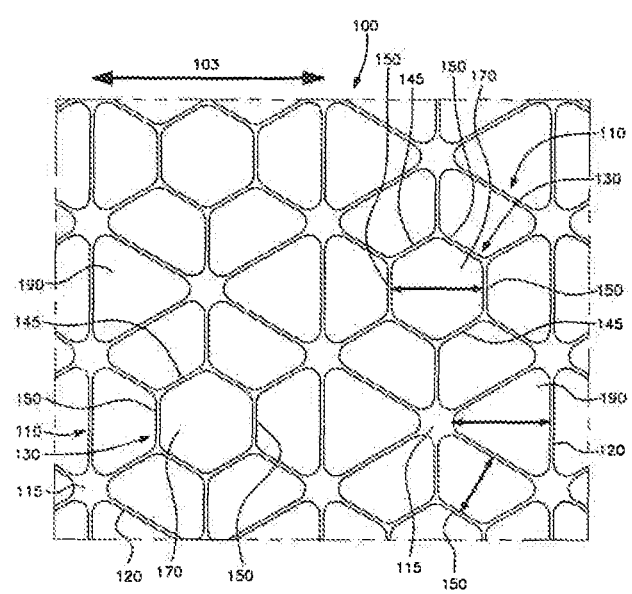
FIG. 27B is a reproduction of FIG. 7 illustrating the nominally same hexagon "across the flats" (A/F) dimension for the samples used in TEST 2 (Rutting) and the results reported in Table E.
Figure 28A:
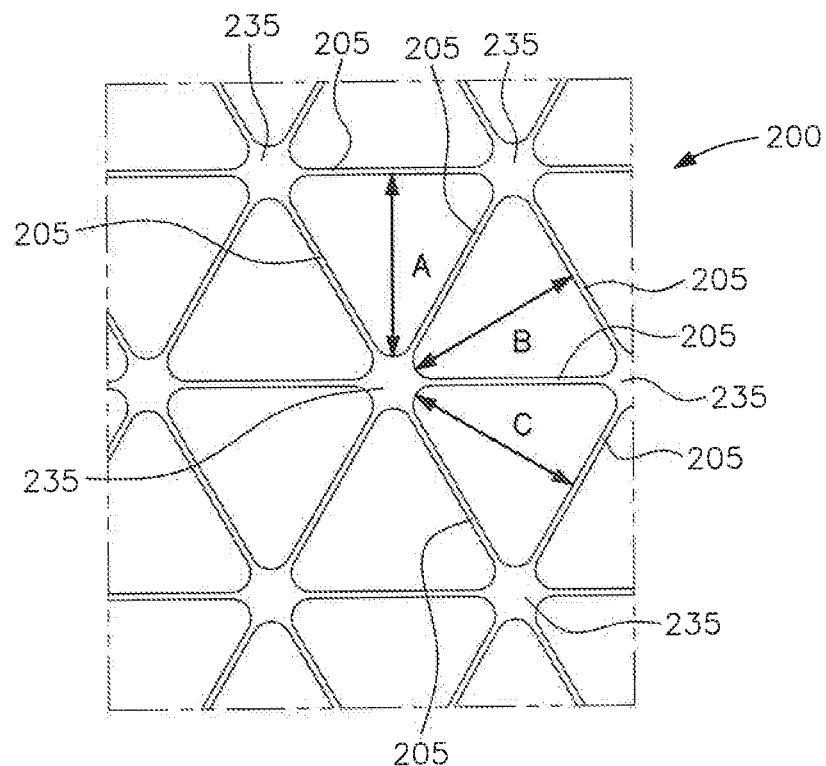
FIG. 28A is another reproduction of FIG. 6 illustrating measurements for the respective apertures of the samples used in TEST 2 (Rutting) and the results reported in Table E.
Figure 28B:
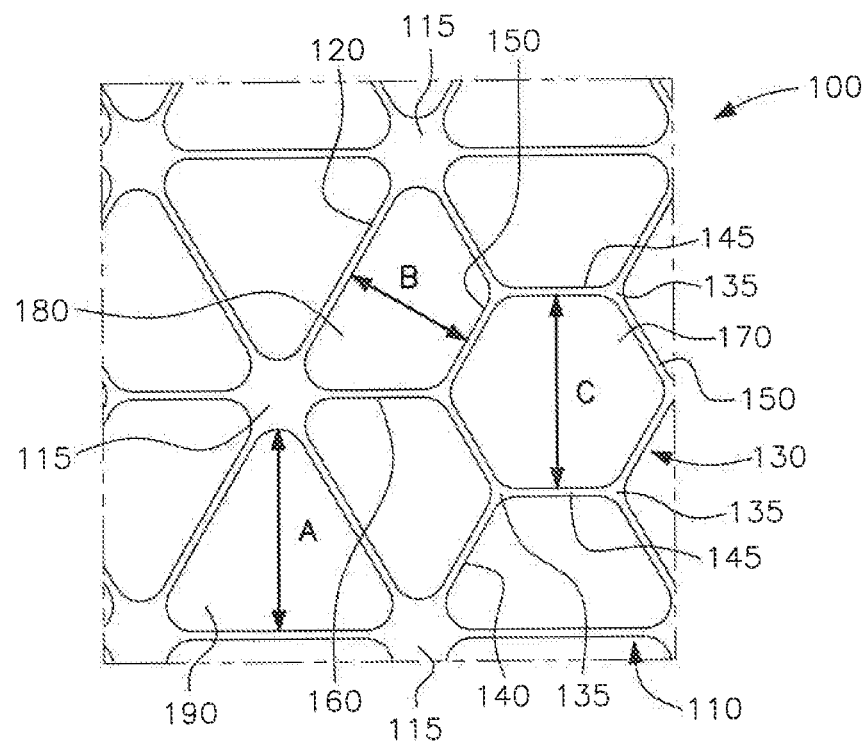
FIG. 28B is another reproduction of FIG. 7 illustrating measurements for the respective apertures of the samples used in TEST 2 (Rutting) and the results reported in Table E.

Trafficking tests were carried out for the specimens shown in Table E below. This table shows data for eight (8) tests of the preferred floating hexagon within a hexagon geometry that is the subject of the present invention, and eighteen (18) tests for the prior art Walsh HAR patents geometry. The specimens were made from these same polymer material (polypropylene), the same punch pattern (except an additional punch was utilized for the specimens of the present invention in order to form the inner hexagon, and a range of similar starting sheet thickness, that produced geogrid samples having nominally the same hexagon across the flats (A/F) dimension 203, 103 as illustrated in FIGS. 27A and 27B, respectively, which are duplicates of the prior Walsh HAR patents geogrid shown in FIG. 6 (prior art) and the geogrid of the present invention shown in FIG. 7. FIGS. 6 (prior art) and 7 are reproduced again in FIGS. 28A and 28B, respectively, to set forth the dimensions of the apertures within the respective outer hexagons. In the FIG. 6 (prior art) samples, Dimensions A, B, and C=33 mm+/−3 mm, and in the invention samples: Dimension A=35 mm+/−3 mm; Dimension B=24 mm+/−3 mm; and Dimension C=30 mm+/−3 mm. The prior art specimens have rib aspect ratios that exceed well beyond those of the specimens that are made in accordance with the present invention. In Table E, Rib A shown in FIGS. 13 and 14 is used for comparison.

TABLE E

| Final pattern description | Final Aperture size (mm AF) | Starting Sheet thickness (mm) | Actual Rib width (mm) | Actual Rib height (mm) | Rib aspect ratio | Av. surface defm. For last 500 passes (mm) |
|---|---|---|---|---|---|---|
| Invention | 80 | 4.6 | 1.23 | 1.77 | 1.45 | 29.9 |
| Invention | 80 | 4.6 | 1.23 | 1.77 | 1.45 | 38.6 |
| Invention | 80 | 4.6 | 1.23 | 1.77 | 1.45 | 39.5 |
| Invention | 81 | 5.45 | 1.14 | 1.75 | 1.57 | 30.5 |
| Invention | 76 | 6.3 | 1.07 | 2.82 | 2.63 | 22.1 |
| Invention | 76 | 6.3 | 1.07 | 2.82 | 2.63 | 28.3 |
| Invention | 77 | 6.3 | 1.14 | 2.8 | 2.47 | 22.1 |
| Invention | 80 | 7.5 | 1.49 | 2.94 | 2.12 | 26.9 |
| Prior Art Multi-axial | 77 | 3 | 2.54 | 0.72 | 0.28 | 48.3 |
| Prior Art Multi-axial | 80 | 3 | 1.08 | 0.87 | 0.81 | 51.9 |
| Prior Art Multi-axial | 80 | 4.55 | 1.06 | 1.56 | 1.47 | 41.0 |
| Prior Art Multi-axial | 80 | 4.55 | 1.06 | 1.56 | 1.47 | 43.2 |
| Prior Art Multi-axial | 80 | 4.55 | 0.73 | 1.74 | 2.38 | 46.4 |
| Prior Art Multi-axial | 80 | 4.55 | 0.66 | 1.97 | 2.98 | 41.7 |
| Prior Art Multi-axial | 81 | 4.55 | 1.06 | 1.56 | 1.47 | 42.9 |
| Prior Art Multi-axial | 81 | 4.55 | 1.06 | 1.56 | 1.47 | 46.1 |
| Prior Art Multi-axial | 81 | 4.55 | 1.62 | 1.39 | 0.86 | 43.7 |
| Prior Art Multi-axial | 79 | 6.3 | 0.69 | 2.82 | 4.09 | 49.9 |
| Prior Art Multi-axial | 80 | 6.3 | 0.72 | 2.68 | 3.72 | 37.2 |
| Prior Art Multi-axial | 80 | 6.45 | 1.3 | 2.1 | 1.62 | 37.7 |
| Prior Art Multi-axial | 79 | 7.5 | 0.78 | 3.44 | 4.41 | 39.2 |
| Prior Art Multi-axial | 80 | 8.5 | 1.51 | 3.52 | 2.33 | 41.7 |
| Prior Art Multi-axial | 80 | 8.5 | 1.07 | 2.94 | 2.75 | 39.5 |
| Prior Art Multi-axial | 80 | 8.5 | 1.19 | 3.51 | 2.95 | 39.0 |
| Prior Art Multi-axial | 80 | 8.5 | 0.66 | 4.13 | 6.26 | 39.2 |
| Prior Art Multi-axial | 82 | 8.5 | 1.13 | 3.91 | 3.46 | 40.2 |

The data in Table E can be used to plot Rib Aspect Ratio against Surface Deformation after 10,000 passes, as an indicator of performance in terms of resistance to rutting. The foregoing plot is presented in the FIG. 24 of the drawings, where specimens of the present invention are identified as "InterAx".

Figure 24:
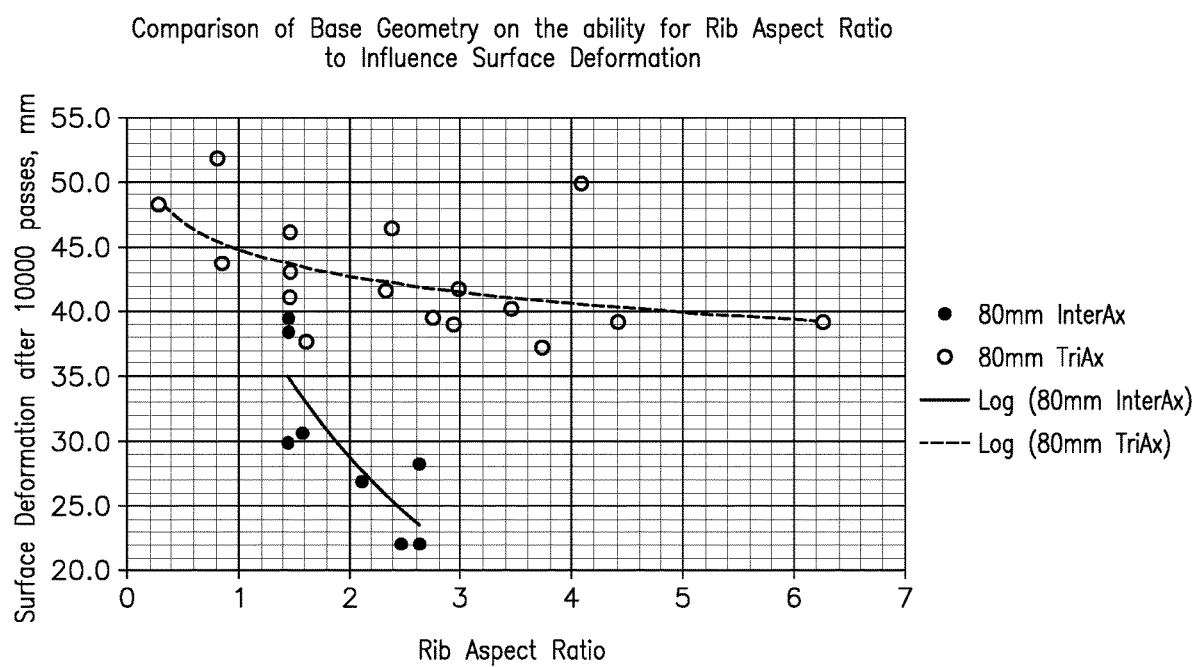
FIG. 24 is a chart which plots the Rib Aspect Ratio against Surface Deformation after 10,000 passes in the multiple trafficking tests reported in Table E, set forth hereinafter.

As evident from FIG. 24, the prior art multiaxial geogrids exhibited similar behavior to that shown in the FIG. 5 of the prior art Walsh HAR patents. There is tendency for the improvement in performance of the prior art geogrid to level off as the rib aspect ratio increases. While a rib aspect ratio of 1 limits surface deformation to around 45 mm surface deformation, an increase in aspect ratio to 2 reduces deformation to 42 mm. It takes an increase of aspect ratio to 5 to limit deformation to 40 mm.

For the geogrid specimens made according to the preferred geometry that is the subject of the present invention, an aspect ratio of 1.4 limits deformation to between 40 mm and 30 mm, while an increase in aspect ratio to 2.6 limits deformation to between 28 mm and 22 mm. This test data demonstrate the substantial improvement of the present invention over the geogrid of the prior art Walsh HAR patents in the suitability of the present invention to stabilize and strengthen aggregate in civil engineering applications.

As evident from the foregoing, the geogrids of the present invention offer significant improvement over prior art geogrids by reason of the unique structure and operation of the floating hexagon within a hexagon configuration to engage with, confine and strengthen aggregate in geotechnical applications.

More specifically, existing commercial prior art geogrids, irrespective of the manufacturing method, have utilized one basic repeating shape and size of aperture opening formed between the oriented ribs/strands and their junctions and nodes. Shapes such as rectangles, square, and triangles have been utilized. The use of one basic repeating shape of aperture also means that the angle formed between two adjacent ribs at an intersecting junction or node has always been the same throughout the geogrid.

Further, existing prior art geogrids, irrespective of the manufacturing method, have repeating continuous ribs in the primary directions. In a product with square or rectangular apertures, such as in the aforementioned Mercer patents, these ribs would be orthogonal and would typically run at 0° and 90° to the machine direction. In a product with triangular apertures, such as in the Walsh '112 patent, these ribs would be dependent on the form of the triangle. In a typical equilateral triangle these ribs would run at 30°, 90° and 150° to the machine direction.

Still further, existing commercial prior art geogrids, also irrespective of the manufacturing method, typically have ribs of roughly the same cross sectional area and aspect ratio, irrespective of the direction in which they run.

These similarities in features of prior art geogrids mean that the properties of the products which allow the geogrid to improve the performance of the geogrid as part of the composite matrix comprising geogrid and granular material are broadly similar throughout the body of the geogrid. These properties referred to in prior art would include (but not exclusively) aperture stability modulus, in-plane and out-of-plane stiffness of the geogrid, rib flexural stiffness in and out of plane, aperture open area, aperture shape, and rib aspect ratio.

Figure 31:
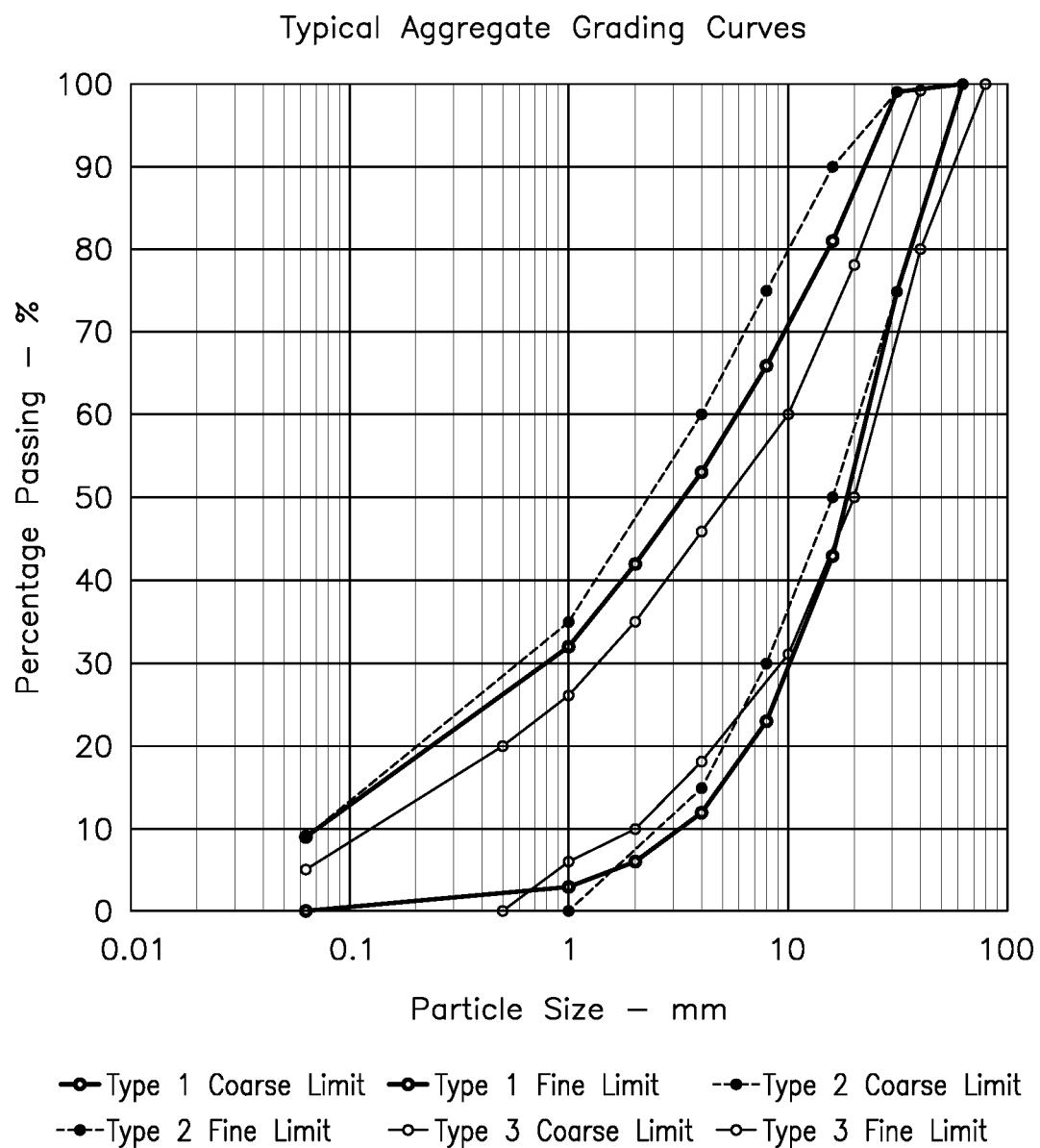
FIG. 31 is a graph illustrating typical grading curves for traditional commonly used granular materials.

Therefore, in accordance with the present invention, it was discovered that the performance of a geogrid in a composite matrix could be improved if the geogrid were more variable in both its repeating geometry as well as its individual features to better integrate with the granular materials that comprise the other component of the composite matrix. The majority of granular material employed as a component of the composite matrix are not uniform in shape or size, but are "graded" with ranges of size, e.g., 20 to 40 mm, 10 to 63 mm, 20 to 70 mm, etc. Typical grading curves for traditional commonly used granular materials are shown in the "Typical Aggregate Grading Curves" graph presented in FIG. 31.

As traditional granular materials become more scarce and more expensive, a wider range of variability in the granular materials being utilized in construction is becoming more prevalent. This prevalence is driven to a large extent by the need to minimize the environmental impacts associated with quarrying of traditional high quality natural aggregates, for example energy and environmental impact of quarrying natural aggregates, pressure to close quarrying activities, impact of transporting quarried materials to site, greater desire to utilize locally available granular materials or recycled materials.

As such, it has been surprisingly discovered that the multi-axial geogrids of the present invention perform better in conjunction with the aforementioned poorer quality and more varied granular materials, and they also perform better with traditional well graded granular material, than prior art commercial geogrids. The geogrid configuration of the present invention out performs existing prior art geogrids and is no longer subject to the same "diminishing returns" rule that exist with the high aspect ratio prior art geogrid of Walsh HAR patents. While the size of the aperture in relation to the intended aggregate in a particular application has to be optimized in prior commercial geogrids, the aperture shape, size and internal angle have all been the same within the macro and micro level of each differently configured geogrid, with a tendency for geogrids based upon a repeating equilateral triangle pattern performing better than those based on rectangular or square openings. In contrast, according to the present invention, the multi-axial geogrid has a repeating geometry comprised of different shapes and sizes of apertures, plural angles of confinement, and formed from ribs of different lengths, heights and widths, in which the ribs preferably have an aspect ratio greater than 1.0; and with some of the ribs, i.e., strong axis strands, extending continuously in a linear fashion transversely and diagonally across the grid while other strands are interrupted to provide zones of local compliance, i.e. engineered discontinuities.

More specifically, with the new geometry and aperture/opening sizes and shapes, it has been surprisingly discovered that the present invention accomplishes two improvements in the containment and stabilization of a greater variety of aggregate. First, by having apertures/openings of different sizes and shapes, the geogrids of the present invention are better able to match with "natural" mineral aggregates that are sourced from quarries or mining methods of various sizes and shapes due to how they are sourced and processed. Second, the geogrids of the present invention better accommodate and stabilize "non-natural" aggregate alternatives, such as recycled concrete and glass which tend to have different physical properties from natural aggregates. While prior art geogrids have been configured for natural aggregates, the geometry of the present invention is able to successfully engage with, confine and stabilize both natural and non-natural aggregates.

Further to the foregoing, it has also been discovered in addition to the performance improvement obtained by the geogrids made in accordance with the present invention, that there should be projected savings in construction material costs, saving in time for construction of the geotechnical matrix embodying the geogrids of the present invention, as well as savings in the carbon dioxide equivalent (CO2e), (see https://www.sustainablebusinesstoolkit.com/difference-between-co2-and-co2e/) over the costs encountered with prior art commercial geogrids such as those made in accordance with the Mercer patents and the Walsh HAR patents. According to present estimates, and comparing geogrids of similar physical properties other than the Walsh HAR examples having high-aspect ratio ribs, and the examples of the present invention having the preferred geometry described in accordance with the present invention set forth herein, the cost savings achieved by geogrids made in accordance with the present invention can be as much as 10% up to 40% or more over the cost of using geogrids made in accordance with aforesaid prior art patents, as shown in Table F below.

TABLE F

|  | Conventional Construction, No Geogrid | Mercer Patent | Walsh HAR Patents | Present Invention |
|---|---|---|---|---|
| Aggregate Layer Thickness | 600 mm | 450 mm | 375 mm | 325 mm |
| Cost/lane km | £55,356 | £46,392 | £41,160 | £38,172 |
| Time/lane km | 4.3 days | 3.3 days | 2.8 days | 2.4 days |
| Carbon/lane km | 232 Tonnes CO2e | 176 Tonnes CO2e | 147 Tonnes CO2e | 128 Tonnes CO2e |

As indicated above, Table F compares conventional "no geogrid" construction, Tensar's commercialized biaxial geogrid construction according to the original Mercer U.S. Pat. No. 4,374,798, Tensar's commercialized triaxial geogrid construction that falls under the Walsh HAR patents, and a projection for utilization of the present invention. The standard thicknesses of the aggregate layer for each of the comparative geogrids is set forth for the relative comparison. The calculations are based on "lane km", which is a standard construction industry measure, at least in the United Kingdom and Europe. The "reference to "Tonne," refers to metric ton (equal to 2,200 lbs).

The foregoing descriptions and drawings should be considered as illustrative of the principles of the invention. The invention may be configured in a variety of sizes and is not limited to the exact shape of the preferred hexagon within a hexagon embodiment. Further, since numerous modifications and changes may readily occur to those skilled in the art, it is not desired to limit the invention to the exact configurations and operation described and shown. Rather, all suitable modifications and equivalents may be resorted to, falling within this scope of the invention.

What is claimed is:

1. A method of making a multi-axial integral geogrid, comprising:
    providing a polymer sheet;
    providing a patterned plurality of holes or depressions in the polymer sheet; and
    biaxially orienting the polymer sheet having the patterned plurality of holes or depressions therein to provide a plurality of interconnected oriented strands and partially oriented junctions forming a repeating pattern of outer hexagons having an array of openings therein, supporting ribs extending inwardly from each of said outer hexagons to support inside each of said outer hexagons a smaller inner hexagon having an unobstructed, open center and oriented strands and tri-nodes, each of said tri-nodes interconnecting only one of said supporting ribs and two of said oriented strands of the inner hexagon, said outer hexagons, said supporting ribs and said inner hexagons defining three different geometric configurations which are repeating throughout an entirety of the geogrid, and said oriented strands and said partially oriented junctions of said outer hexagons defining a plurality of linear strands that extend continuously throughout the entirety of the geogrid.

2. The method according to claim 1, wherein the multi-axial integral geogrid has a thickness of from about 3 mm to about 9 mm.

3. The method according to claim 1, wherein the three different geometric configurations of the multi-axial integral geogrid are hexagonal, trapezoidal, and triangular shapes.

4. The method according to claim 1, wherein the inner hexagon of the multi-axial integral geogrid can deflect up and down out of a plane of the geogrid during compaction of aggregate.

5. The method according to claim 4, wherein the inner hexagon of the multi-axial integral geogrid can deflect up and down out of the plane of the geogrid up to about 33% of a thickness of the partially oriented junctions.

6. The method according to claim 4, wherein the inner hexagon of the multi-axial integral geogrid can deflect up and down out of the plane of the geogrid in an area of compliance on the order of about 50% to about 75% relative to a height of the partially oriented junctions.

7. The method according to claim 1, wherein the oriented strands of the multi-axial integral geogrid have an aspect ratio of greater than about 1.5.

8. The method according to claim 1, wherein the multi-axial integral geogrid has three continuous linear strands that extend continuously throughout the entirety of the geogrid, the three continuous linear strands being separated from each other by about 120°.

9. The method according to claim 1, wherein the multi-axial integral geogrid is a monolayer.

10. The method according to claim 1, wherein the openings of the multi-axial integral geogrid provide a range of distribution of individual aperture area of from about 475 $mm^2$ to about 800 $mm^2$.

11. The method according to claim 10, wherein the openings of the multi-axial integral geogrid provide a range of distribution of individual aperture area of from about 500 $mm^2$ to about 700 $mm^2$.

12. The method according to claim 1, wherein said plurality of linear strands of the multi-axial integral geogrid extend continuously throughout the entirety of the geogrid without intersecting said inside of the outer hexagons.

13. The method according to claim 1, wherein the step of biaxially orienting the polymer sheet having the patterned plurality of holes or depressions therein includes stretching the polymer sheet in a machine direction and in a transverse direction.

14. A method of making a reinforced and stabilized composite soil structure, comprising:
    embedding a multi-axial integral geogrid in a mass of particulate material so as to engage with said particulate material,
    said multi-axial integral geogrid including a plurality of interconnected oriented strands and partially oriented junctions forming a repeating pattern of outer hexagons having an array of openings therein, supporting ribs extending inwardly from each of said outer hexagons to support inside each of said outer hexagons a smaller inner hexagon having an unobstructed, open center and oriented strands and tri-nodes, each of said tri-nodes interconnecting only one of said supporting ribs and two of said oriented strands of the inner hexagon, said outer hexagons, said supporting ribs and said inner hexagons defining three different geometric configurations which are repeating throughout an entirety of the geogrid, said oriented strands and said partially oriented junctions of said outer hexagons defining a plurality of linear strands that extend continuously throughout the entirety of the geogrid, and said geogrid having a thickness of from about 3 mm to about 9 mm.

15. A method of making a multi-axial integral geogrid, comprising:
providing a polymer sheet;
providing a patterned plurality of holes or depressions in the polymer sheet; and
biaxially orienting the polymer sheet having the patterned plurality of holes or depressions therein to provide a plurality of interconnected oriented strands and partially oriented junctions forming a repeating pattern of outer hexagons having an array of openings therein, each of said outer hexagons supporting, by oriented ribs, a smaller oriented inner geometric configuration having an unobstructed, open center, said oriented strands, said partially oriented junctions, said oriented ribs and said inner geometric configurations forming at least three different geometric configurations which are repeating throughout an entirety of the multi-axial geogrid, said oriented strands and said partially oriented junctions of said outer hexagons defining a plurality of linear strands that extend continuously throughout the entirety of the geogrid, and said geogrid having a thickness of from about 3 mm to 9 mm.

16. The method according to claim 15, wherein the three different geometric configurations of the multi-axial integral geogrid are hexagonal, trapezoidal, and triangular shapes.

17. The method according to claim 15, wherein said inner geometric configuration of the multi-axial integral geogrid can deflect up and down out of a plane of said geo grid.

18. The method according to claim 15, wherein the oriented strands of the multi-axial integral geogrid have an aspect ratio of greater than about 1.5.

19. The method according to claim 15, wherein the multi-axial integral geogrid has three continuous linear strands that extend continuously throughout the entirety of the multi-axial integral geogrid, the three continuous linear strands being separated from each other by about 120°.

* * * * *